United States Patent
Watanabe

(10) Patent No.: US 9,894,508 B2
(45) Date of Patent: Feb. 13, 2018

(54) MACROCELL BASE STATION AND TERMINAL

(71) Applicant: FUJITSU LIMITED, Kawasaki-shi, Kanagawa (JP)

(72) Inventor: Hiroaki Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 164 days.

(21) Appl. No.: 14/947,242

(22) Filed: Nov. 20, 2015

(65) Prior Publication Data
US 2016/0080947 A1   Mar. 17, 2016

Related U.S. Application Data

(63) Continuation of application No. PCT/JP2013/064343, filed on May 23, 2013.

(51) Int. Cl.
*H04W 8/02* (2009.01)
*H04W 8/26* (2009.01)
(Continued)

(52) U.S. Cl.
CPC .............. *H04W 8/02* (2013.01); *H04W 8/26* (2013.01); *H04W 16/14* (2013.01); *H04W 16/18* (2013.01); *H04W 16/30* (2013.01); *H04W 16/32* (2013.01); *H04W 48/08* (2013.01); *H04W 48/16* (2013.01); *H04W 84/045* (2013.01)

(58) Field of Classification Search
CPC ... H04W 16/32; H04W 84/045; H04W 88/08; H04W 8/26
See application file for complete search history.

(56) References Cited

U.S. PATENT DOCUMENTS 8,934,911 B2 *  1/2015  Lee ................. H04W 8/02
                                                    370/331
9,078,280 B2 *  7/2015  Watanabe .......... H04W 16/32
(Continued)

FOREIGN PATENT DOCUMENTS

EP    1 626 606 A1    2/2006
EP    2 775 761 A1    9/2014
(Continued)

OTHER PUBLICATIONS

Extended European search report with the supplementary European search report and the European search opinion issued for corresponding European Patent Application No. 13885020.1 dated Apr. 11, 2016.
(Continued)

*Primary Examiner* — Raj Jain
(74) *Attorney, Agent, or Firm* — Myers Wolin, LLC

(57) ABSTRACT

A macrocell base station includes a storage to store information of a plurality of virtual areas obtained by dividing a macrocell and information of small cells associated with the plurality of virtual areas, and a controller to perform a process of specifying the virtual area where the terminal is located, the specifying using a distance between the macrocell base station and the terminal residing in the macrocell, and a process of generating cell search information for the small cell that is to be transmitted to the terminal, the generating using the small cell information associated with the information of the specified virtual area.

8 Claims, 27 Drawing Sheets

(51) Int. Cl.
  *H04W 16/30* (2009.01)
  *H04W 16/32* (2009.01)
  *H04W 16/14* (2009.01)
  *H04W 16/18* (2009.01)
  *H04W 48/08* (2009.01)
  *H04W 48/16* (2009.01)
  *H04W 84/04* (2009.01)

(56) References Cited

U.S. PATENT DOCUMENTS

| | | |
|---|---|---|
| 2006/0034236 A1 | 2/2006 | Jeong et al. |
| 2006/0092872 A1 | 5/2006 | Lee et al. |
| 2010/0151864 A1 | 6/2010 | Mori |
| 2010/0254338 A1* | 10/2010 | Tanaka ............ H04W 48/12 370/329 |
| 2011/0267977 A1 | 11/2011 | Doppler et al. |
| 2012/0263145 A1 | 10/2012 | Marinier et al. |
| 2013/0084879 A1 | 4/2013 | Abe et al. |
| 2013/0095811 A1 | 4/2013 | Okino |
| 2013/0109384 A1 | 5/2013 | Abe et al. |
| 2013/0150060 A1 | 6/2013 | Abe et al. |
| 2013/0210431 A1 | 8/2013 | Abe et al. |
| 2013/0279358 A1 | 10/2013 | Nagata et al. |
| 2014/0364126 A1 | 12/2014 | Fukuta et al. |
| 2016/0080947 A1* | 3/2016 | Watanabe ............ H04W 16/30 370/254 |

FOREIGN PATENT DOCUMENTS

| | | |
|---|---|---|
| JP | 2006-135991 A | 5/2006 |
| JP | 2008-508832 A | 3/2008 |
| JP | 2008-278264 A | 11/2008 |
| JP | 2009-278450 A | 11/2009 |
| JP | 2011-223113 A | 11/2011 |
| JP | 2011-223635 A | 11/2011 |
| JP | 2011-238981 A | 11/2011 |
| JP | 2012-5002 A | 1/2012 |
| JP | 2012-5080 A | 1/2012 |
| JP | 2012-39168 A | 2/2012 |
| JP | 2012-104950 A | 5/2012 |
| WO | 2013/065843 A1 | 5/2013 |

OTHER PUBLICATIONS

Notification of Reasons for Refusal issued by the Japan Patent Office for corresponding Japanese Patent Application No. 2015-517995, dated Feb. 21, 2017, with an English translation.

International Search Report issued for corresponding International Patent Application No. PCT/JP2013/064343, dated Jun. 18, 2013.

* cited by examiner

FIG. 11

RESIDING VIRTUAL AREA TABLE
(SECTOR S1)
                                                     38

| VIRTUAL AREA | VIRTUAL AREA INFO. | SMALL CELL INFO. | RESIDING USER ID |
|---|---|---|---|
| VA−A | .... | NOTHING | |
| VA−B | .... | .... | |
| VA−C | .... | NOTHING | 13a |

FIG. 23

| CELL ID | USER ID | RESULT OF CELL SEARCH (OK/NG) | EXPENDED TIME FOR CELL SEARCH (THIS INFO. IS VALID ONLY WHEN RESULT IS OK) | RETRY COUNT FOR CELL SEARCH (THIS INFO. IS VALID ONLY WHEN RESULT IS OK) |
|---|---|---|---|---|

MACROCELL BASE STATION AND TERMINAL

CROSS-REFERENCE TO RELATED APPLICATION

This application is a continuation application of International Application PCT/JP2013/064343 filed on May 23, 2013 and designated the U.S., the entire contents of which are incorporated herein by reference.

FIELD

The present disclosure pertains to a macrocell base station and a terminal.

BACKGROUND

A HetNet (Heterogeneous Network) is a technology of allocating a plurality of small cells in an overlay configuration in a macrocell area for improving a decrease in throughput of user data concomitantly with an increase in the number of users in a mobile communication system for only a conventional macrocell.

The HetNet mobile communication system includes a macrocell base station to provide a large zone area (macrocell area), and one or more small cell base stations to provide one or more small zone areas (small cell areas), which are geographically overlaid on the macrocell area.

In the HetNet mobile communication system, a user terminal generally is in the macrocell area and receives communication services from the macrocell base station forming the macrocell. In contrast, the user terminal, when located in the vicinity of the small cell area, performs handover (off-load) to the small cell area. The user terminal receives the communication services from the small cell base station forming the small cell when residing in the small cell area, and is thereby enabled to perform data communications with a high throughput.

For further information, see Japanese Laid-Open Patent Publication No. 2012-39168, Japanese Laid-Open Patent Publication No. 2012-5080, Japanese Laid-Open Patent Publication No. 2011-223113, Japanese Laid-Open Patent Publication No. 2012-104950, and Japanese Laid-Open Patent Publication No. 2011-238981.

In the conventional HetNet mobile communication system, the user terminal being in the macrocell area but not being in the small cell area executes a cell search based on "peripheral cell information" (also called "adjacent cell information) contained in notifying information received from the macro cell. In the macrocell area, information of all of the small cell areas existing within one macrocell area is notified as the "peripheral cell information" to the macrocell area throughout.

On the other hand, there is ununiformity in allocation of the small cells within the macrocell area, i.e., there are a region with the small cells being densely located in the macrocell area and a region with any small cell not existing as the case may be. In this case, when the "peripheral cell information" is notified by the foregoing notifying method, it follows that the user terminal located in the region with any small cell not existing continues executing the cell search in spite of the small cell not actually existing in the vicinity of the present location. This continuation of executing the cell search in an environment with a low success rate brings about a waste of electric power.

SUMMARY

An embodiment of the present invention is directed to a macrocell base station to form a macrocell, the macrocell base station including: a storage configured to store information of a plurality of virtual areas obtained by dividing the macrocell and information of small cells associated with the plurality of virtual areas; and a controller configured to perform processes including specifying the virtual area in which the terminal is located by using a distance between the macrocell base station and the terminal residing in the macrocell, and generating cell search information for the small cell that is to be transmitted to the terminal by using the small cell information associated with the information of the specified virtual area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 11 is a diagram illustrating an example of a residing virtual area table;

FIG. 23 illustrates an example of a message transmitted from the terminal according to the third embodiment;

DESCRIPTION OF EMBODIMENTS

Embodiments of the present invention will hereinafter be described with reference to the drawings. Configuration of the following embodiments are exemplifications, and the present invention is not limited to the configurations of the embodiments.

Reference Example

A description will start with an example of a configuration of a mobile communication system (e.g., HetNet mobile communication system) according to a reference example. The mobile communication system according to the reference example has a configuration common to the mobile communication system according to each embodiment. The mobile communication system according to the reference example includes one or more macrocell base stations each forming a macrocell area, and one or more small cell base stations each forming a small cell area. The macrocell base station forms the macrocell. The small cell base station configures the small cell. One or more small cell base stations are disposed within the macrocell formed by the macrocell base station.

Figure 1:
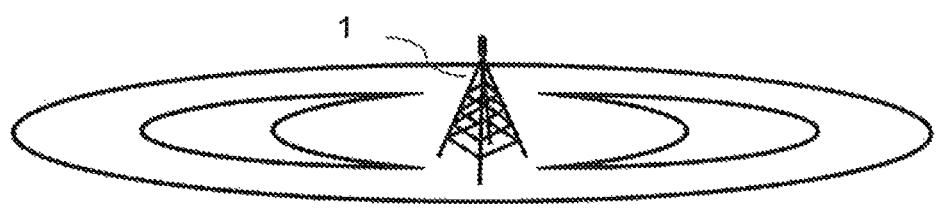
FIG. 1 illustrates an omni cell configured by a macrocell base station.
Figure 2:
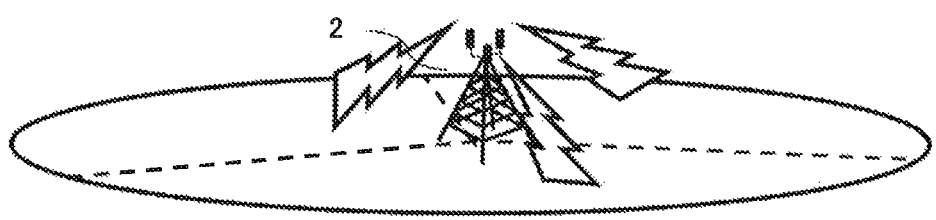
FIG. 2 illustrates a sector cell configured by the macrocell base station.

FIGS. 1 and 2 illustrate examples of the cells configured by the macrocell base stations. FIG. 1 depicts the example of a configuration of an omni-cell as one example of the macrocell, and FIG. 2 depicts the example of a configuration of a sector cell as one example of the macrocell.

As depicted in FIG. 1, the omni-cell is formed by a macrocell base station 1 including a non-directional antenna having single directivity in all directions. By contrast, the sector cell is formed by a macrocell base station 2 including an n-numbered ("n" is a natural number) of directional antennas. The example depicted in FIG. 2 is that the macrocell base station 2 forms three sectors formed by three directional antennas. An aggregation of plural sectors formed by one macrocell base station will hereinafter be termed a "base station area" in the present specification. The single macrocell is formed in the omni-cell configuration. By contrast, each sector functions as a cell being independent of other sectors in the sector cell configuration. In other words, each sector functions as the macrocell.

In the mobile communication system according to the embodiment, the macrocell may be formed based on the omni-cell configuration and may also be formed based on the sector cell configuration. A number of sectors forming the "base station area" can be properly determined. Generally, the sector cell configuration is adopted when increasing a number of users receivable by within a certain area. The discussions on the following embodiments involve exemplifying the macrocell base station forming the sector cell encompassing the three sectors.

Figure 3:
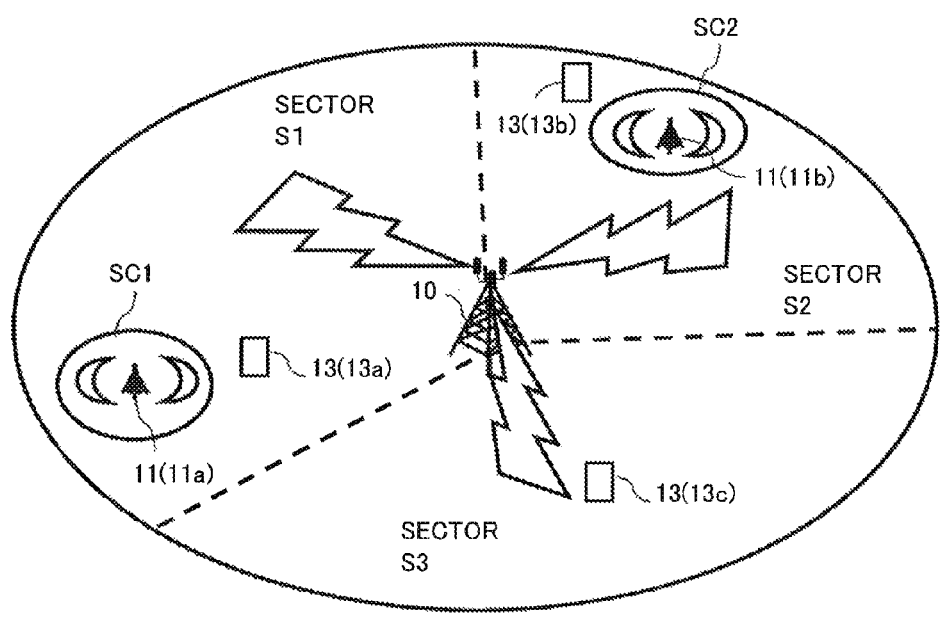
FIG. 3 is an explanatory view illustrating a macrocell area and small cell areas according to a reference example.

FIG. 3 is a view illustrating an example of the mobile communication system including the macrocell cell area and the small cell areas. FIG. 3 depicts the macrocell area formed to include the three sectors (three macrocells), and the small cell areas formed within the macrocell area. In FIG. 3, the macrocell base station 10 forms three sectors (a sector S1, a sector S2 and a sector S3) by a directional antenna group. Each sector may function as a macrocell independent of other sectors. The macrocell area is formed by an aggregation of these sectors.

The small cell area is formed by disposing a small cell base station 11 forming the small cell within the macrocell cell area. In the example illustrated in FIG. 2, the small cell base stations (a small cell base station 11a, a small cell base station 11b) are disposed respectively in the sector 1 and the second 2.

Each small cell base station 11 (the small cell base station 11a, the small cell base station 11b) forms a local small cell (a small cell SC1, a small cell SC2) smaller than the macrocell, e.g., based on the omni-cell configuration. By contrast, the small cell base station is not disposed in a region of the sector 3.

A user terminal (which will hereinafter be referred to as a terminal apparatus or simply a "terminal) 13 may be connected to both of the macro cell and the small cell. The terminal 13 resides in the macrocell area and performs communications via the macrocell base station 10. In this context, the terminal 13, upon detecting the small cell through a cell search, carries out a handover or off-load to the small cell, and resides in the small cell area (the small cell). The terminal 13 is thereby enabled to perform the communications via the small cell base station 11.

As a wireless access method applicable to the mobile communication system relating to the embodiment, for example, there is Wideband Code Division Multiple Access (W-CDMA), Long Term Evolution (LTE) or LTE-Advanced. The mobile communication system is not, however, limited to the system using the wireless access method pertaining to 3GPP described above. The mobile communication system may also be a network system using the wireless access methods based on a variety of wireless LANs instanced by Worldwide Interoperability for Macrowave Access (WiMAX: IEEE802.16-2004, IEEE802.16e, and other equivalent wireless standards).

The macrocell base station 10 can configure the macrocell having a cell radius that is, e.g., several hundred meters or several kilometers through several ten kilometers. For instance, as depicted in FIG. 3, one or more small cells are disposed within the macrocell in a state of their being geographically overlapped (overlaid). The small cells are disposed irregularly or spotwise. The small cells are disposed in a district instanced by an urban district and a densely populated district.

Generally, the small cell is classified into a picocell (a cell radius: several meters through several ten meters) and a microcell (the cell radius: several ten meters through several hundred meters). The small cell encompasses the picocell and the microcell.

Communication services using the microcells are provided via a radio frequency of, e.g., a 2 GHz band. On the other hand, communication services using the small cells are provided via a radio frequency of, e.g., an 800 MHz band. Thus, the microcell and the small cell are operated by using the radio frequencies different from each other.

The user terminal (terminal 13) employed in the mobile communication system is a so-called dual terminal that supports the use of both of the radio frequency for the macrocell and the radio frequency for the small cell as described above.

The macrocell base station 10 and the small cell base station 11 are interconnected via an unillustrated backhaul line, and are further connected via the backhaul line to a mobile communication exchange (unillustrated) ranked in a higher order.

The terminal 13 detects the small cell by executing the cell search based on "peripheral cell information" notified in the macrocell area, and is thereby enabled to connect with the small cell. The peripheral cell information is one instance of "cell search information for a small cell".

Herein, a conventional notifying method of the "peripheral cell information" will be described. The peripheral cell information (common among the sectors S1, S2 and S3) directed to the overall macrocell area formed by the macrocell base station 10 has hitherto been generated in the macrocell base station 10 as depicted in FIG. 3. Generated in the example illustrated in FIG. 3 is the peripheral cell information containing cell information of the small cell SC1 and the cell information of the small cell SC2.

The peripheral cell information described above is contained in notifying information notified to within the macrocell area and thus transmitted (notified) to each of the sectors S1, S2 and S3 from the respective directional antennas equipped in the macrocell base station 10. Each terminal 13 residing in the macrocell area may receive the notified peripheral cell information. The terminal 13 having received the peripheral cell information executes the cell search targeting on each of the small cells contained in the peripheral cell information till the cell search becomes successful (till detecting the small cell).

Here, the terminal 13 (the terminal 13a in FIG. 3) located within the sector S1 executes the cell search targeting on the small cells SC1 and SC2, based on the peripheral cell information received from the macrocell base station 10. As a result, the terminal 13a can detect the small cell SC1 and can connect with the small cell SC1.

The terminal 13 (the terminal 13b in FIG. 2) located in the sector S2 executes the cell search based on the "peripheral cell information", and is thereby enabled to detect and connect with the small cell SC2.

However, the terminal 13 (the terminal 13c in FIG. 2) cannot detect the small cell even by executing the cell search based on the peripheral cell information because of there being none of the small cell in the sector S3. Accordingly, the terminal 13c wastes electric power by continuing to execute the cell search. As a result of such a waste of electric power, the terminal 13c may possibly run out of battery at an early stage.

The reference example entails adopting a method of individually transmitting the "peripheral cell information" per sector to avoid the foregoing problem. To be specific, the peripheral cell information is transmitted (notified) to the sector S1, the peripheral cell information containing the cell information (of the small cell SC1) of the small cell located within the sector SC1. The peripheral cell information is transmitted (notified) to the sector S2, the peripheral cell information containing the cell information (of the small cell SC2) of the small cell located within the sector SC2. The peripheral cell information indicating "no peripheral cell" is notified to the sector S3 because of non-existence of the small cell.

The terminal 13a is thereby enabled to execute the cell search targeting on only the small cell SC1. Further, the terminal 13b can execute the cell search targeting on only the small cell SC2. Thus, the target small cells decrease, and, as a result, each of the terminals 13a, 13b can execute the efficient cell search.

While on the other hand, the terminal 13c receives the peripheral cell information indicating "no peripheral cell", and is thereby enabled to recognize that any small cell does not exist in the periphery of the self-station (the sector SC3). As a consequence, the terminal 13c does not execute the cell search, and can therefore reduce consumption of the battery by avoiding the waste of electric power.

First Embodiment

Figure 4:
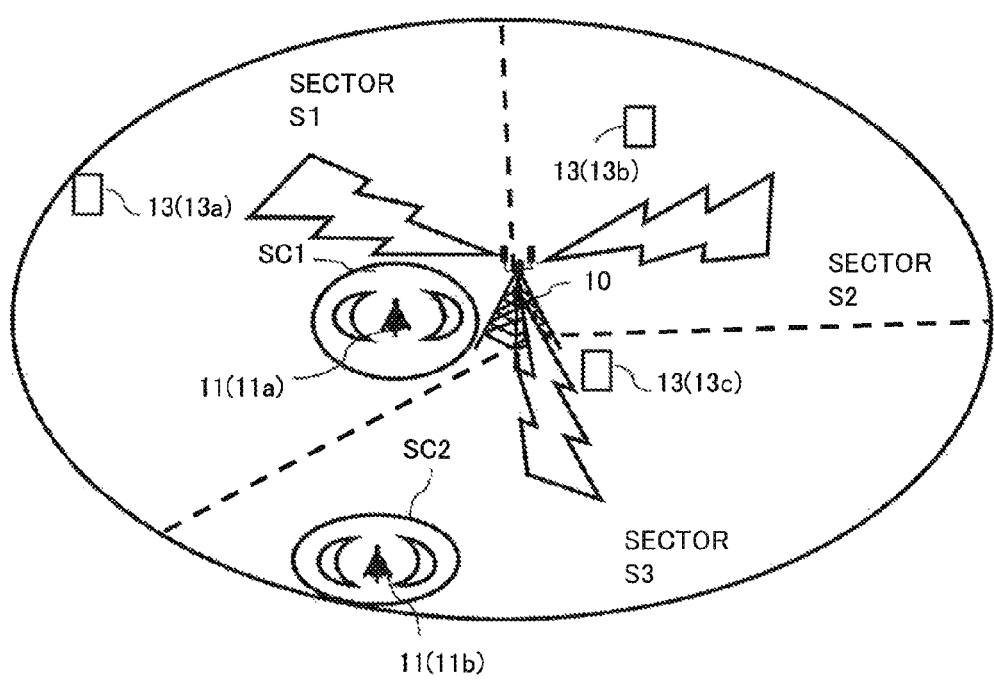
FIG. 4 illustrates an example of a mobile communication system according to a first embodiment.

Next, a first embodiment will be described. The first embodiment has a configuration common to the reference example, and hence the discussion will be focused mainly on different points while omitting the descriptions of the common points. FIG. 4 illustrates an example of a mobile communication system according to the first embodiment.

In FIG. 4, an allocation of the small cells is different from the reference example (FIG. 3). To be specific, the small cell SC1 is located in the vicinity (immediately under the antenna) of the macrocell base station 10 in the sector S1. Moreover, the small cell SC2 is located not in the sector S2 but in the sector S3 at an edge (a cell border: a farthest edge as viewed from the macrocell base station 10) of the macrocell.

On the other hand, in FIG. 4, the terminal 13a is located at the edge region (the cell border) of the sector S1; the terminal 13b is located in the sector S2; and the terminal 13c is located in the vicinity of the antenna of the macrocell base station 10.

In the state depicted in FIG. 4, when notifying the "peripheral cell information" per sector as described in the reference example, the notification is conducted as follows. Specifically, the peripheral cell information containing the cell information of the small cell SC1 is notified to the sector S1. The peripheral cell information indicating the non-existence of the small cell is notified to the sector S2. The peripheral cell information indicating (containing) the cell information of the small cell SC2 is notified to the sector S3.

The terminal 13b residing in the sector S2 receives the peripheral cell information indicating the non-existence of the small cell, and is thereby enabled to avoid executing the futile cell search. The terminal 13a residing in the sector S1 receives the cell information of the small cell SC1 as the peripheral cell information. The location of the terminal 13a is, however, distanced from the location of the small cell SC1. Consequently, the terminal 13a cannot sufficiently receive radio waves from the small cell SC1. Accordingly, even when the terminal 13a executes the cell search for the small cell SC1, based on the peripheral cell information, the cell search does not become successful, and hence the terminal 13a repeats the futile cell search, possibly resulting in the futility of the electric power.

The terminal 13c is also distanced from the small cell SC2, therefore has a low possibility of the success in the cell search, and repeats the futile cell search, possibly resulting in the futility of the electric power. The first embodiment will discuss a configuration enabling avoidance of the waste of the electric power due to the futile cell search (exhibiting a low success rate).

In the first embodiment, the location of the terminal 13 in the macrocell is not only classified on a per sector basis but also further classified inclusive of a distance from the macrocell base station within the sector. To be specific, in the first embodiment, an internal area of the sector (macrocell) is divided into a plurality of virtual areas corresponding to distances from the macrocell base station 10, and the notification or non-notification of the cell information of the small cell is separately determined corresponding to the virtual area in which the terminal 13 is located.

Concretely, in the first embodiment, the distance between the macrocell base station 10 and the terminal 13 is grasped by measuring a round trip time (RTT) related to the target terminal 13, and it is determined based on the distance obtained by the RTT from the macrocell base station 10 whether the cell information of the small cell is notified.

Figure 5:
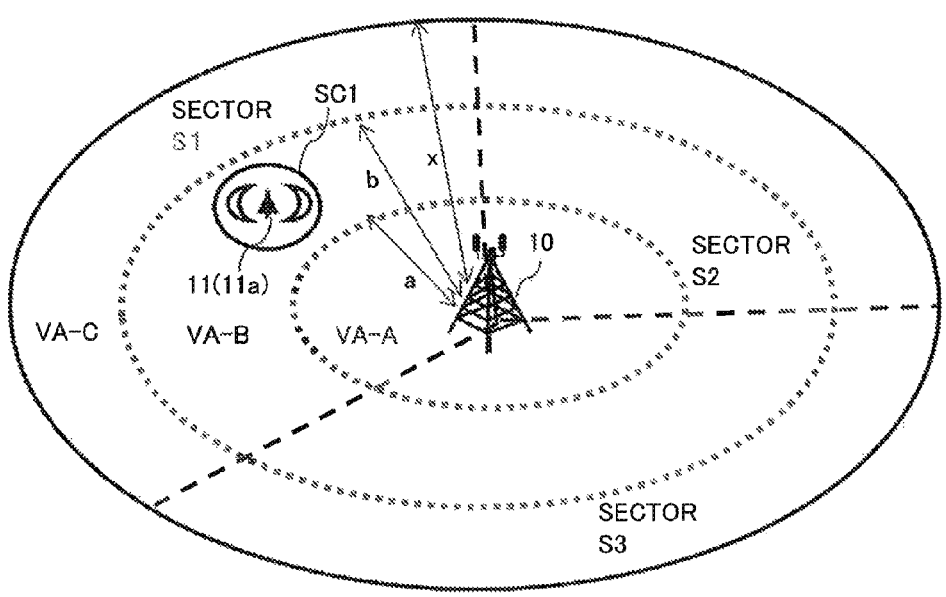
FIG. 5 is an explanatory view illustrating an example of virtualizing a cell (sector) into virtual areas.

FIG. 5 is an explanatory view depicting an example of virtualizing the areas for the cells (sectors). As depicted in FIG. 5, an assumption is that the macrocell and the small cell take circular shapes being concentric about a position of the base station, and each of the sectors S1, S2, S3 takes a fan shape.

In FIG. 5, the macrocell base station 10 has the macrocell area with a cell radius "x", and the small cell SC1 existing in the sector 1 is located between a distance "a" from the macrocell base station 10 and a distance "b" from the macrocell base station 10.

In this case, the sector S1 can be virtually divided corresponding to the distances from the macrocell base station 10 into, e.g., three areas as follows. The distance "a" and the distance "b" are determined based on the cell radius "c" of the small cell SC1 so that, e.g., an inequality "(b-a)≤2c" is established. Each of the sectors S2, S3 can be divided into three areas by the same method as the sector S1 is divided.

Virtual Area VA-A: an area extending from a distance "0" to the distance "a" from the macrocell base station 10;

Virtual Area VA-B: an area extending from the distance "a" to the distance "b" from the macrocell base station 10; and Virtual Area VA-C: an area extending from the distance "b" to a distance "x" from the macrocell base station 10.

The macrocell base station 10 measures a distance "d" between the terminal 13 residing in the sector S1 and the macrocell base station 10 (the center of the macrocell) by use of the RTT, and, when the distance "d" falls within a range of the distance "0" through the distance "a" (0≤d<a), the macrocell base station 10 recognizes that the terminal 13 is located in the virtual area VA-A. When the distance "d" falls within a range of the distance "a" through the distance "b" (a≤d<b), the macrocell base station 10 recognizes that the terminal 13 is located in the virtual area VA-B. When the distance "d" is equal to or larger than the distance "b" (b≤d), the macrocell base station 10 recognizes that the terminal 13 is located in the virtual area VA-C.

Figure 6:
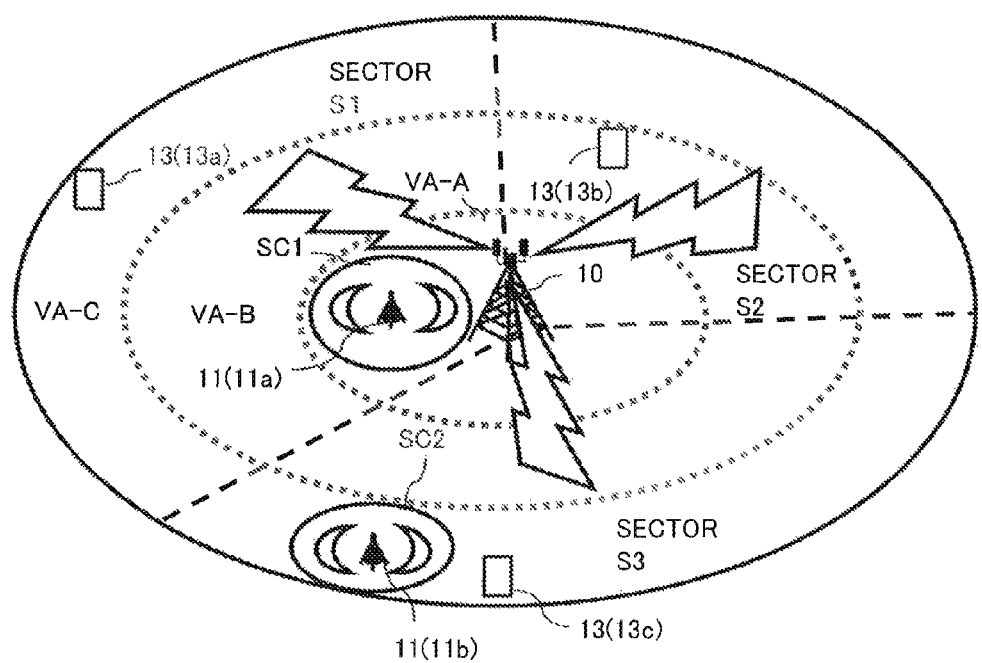
FIG. 6 depicts a state of the virtual areas being applied to the mobile communication system illustrated in FIG. 4.

When applying the virtual areas VA-A, VA-B and VA-C to FIG. 4, a configuration becomes as in FIG. 6. The location of the terminal 13c in FIG. 6 is, however, different from FIG. 4. The virtual areas VA-A, VA-B and VA-C in FIG. 6 may be, unlike the above-mentioned, determined by taking account of, e.g., the distance "a" and the distance "b" that follow.

The distance "a": the distance between the center of the macrocell and a point existing in a farthest position from the center of the macrocell; and The distance "b": the distance between the center of the macrocell and a point, existing in a closest position to the center of the macrocell, of the small cell SC2.

Thus, a division count of the virtual area and a size of each virtual area may be properly determined based on, e.g., the number of small cells located in the sector, the cell radius of each small cell, and the distance between each small cell and the center of the macrocell.

In a status depicted in FIG. 6, the macrocell base station 10 recognizes that the terminal 13a is located in the virtual area VA-C of the sector S1. The terminal 13b is located in the virtual area VA-B of the sector S2. The terminal 13c is located in the virtual area VA-C of the sector S3.

The macrocell base station 10 notifies, based on the recognition described above, the following peripheral cell information. To be specific, the macrocell base station 10 notifies the peripheral cell information indicating the non-existence of the small cell to the terminal 13b. Further, the macrocell base station notifies the peripheral cell information indicating the non-existence of the small cell to the terminal 13a. This is because there is a large distance from the small cell SC1 in the sector S1. This notification enables the terminal 13a to avoid executing the futile cell search.

In contrast with this, the macrocell base station 10 notifies the peripheral cell information containing the cell information of the small cell SC3 to the terminal 13c. The terminal 13c detects the small cell SC3 by executing the cell search for the small cell SC3, based on the peripheral cell information, and is thereby enabled to connect with the small cell SC3.

[Notifying Method of Peripheral Cell Information]

Next, an in-depth description of a notifying method of peripheral cell information will be made. The macrocell base station 10 transmits a radio signal (a downlink radio signal) along a downlink to the terminal 13 via a wireless zone with respect to the sector areas (the sectors S1, S2 and S3) of the macrocell. This downlink radio signal contains an unmodulated reference signal (also called a pilot signal) used for the terminal 13 to ensure timing synchronization, and a frame signal.

The terminal 13 establishes the timing synchronization by searching for the reference signal and detecting the frame signal. This operation is called the cell search. The terminal having established the timing synchronization of the downlink radio signal by the cell search next receives the notifying information contained in the downlink radio signal.

The macrocell base station 10 broadcasts the notifying information to the macrocell area throughout. With the transmission of the notifying information, the terminal 13 is notified of various categories of information on the self-cell and information on an access to the cell.

The information on the access to the cell contains transmission timing information (RACH transmission timing) of a random access channel (RACH) used for the terminal to have an initial access. Relative timing based on timing of the downlink radio signal transmitted from the macrocell base station 10, is designated as the RACH transmission timing.

The terminal 13 having received the RACH transmission timing transmits a RACH signal at timing obtained by adding the RACH transmission timing to the reference timing of the downlink radio signal, to an uplink (upstream) wireless line.

The macrocell base station 10 receives the RACH signal. Reception timing of the RACH signal is timing delayed by a period of arrival delay time (i.e., round trip time (RTT)) in the wireless zone, the timing containing a period of time for which the RACH signal is received by the terminal 13 from the reference timing in the macrocell base station 10 and reaches the macrocell base station 10 from the terminal 13.

The macrocell base station 10 measures, as the RTT, a difference between the RACH transmission timing (the reference timing) based on the transmission timing of the RACH signal from the macrocell base station 10 and the timing (reception timing) when actually receiving the RACH signal from the terminal 13. The macrocell base station 10 instructs the terminal 13 to correct the timing for the RTT in the downlink radio signal.

The terminal 13 having received the timing correction instruction from the macrocell base station 10 corrects the RACH transmission timing in response to the timing correction instruction, and re-transmits the RACH signal. The macrocell base station 10 receives the re-transmitted RACH signal and, upon confirmation that the RACH signal falls within a predefined timing range, determines that the uplink radio synchronization with the terminal 13 is established.

Subsequently, the macrocell base station 10 allocates a radio resource unique to the terminal 13 via the downlink wireless line to the terminal 13, thus permitting the terminal 13 to transmit and receive the signal of a Dedicated CHannel (DCH).

The macrocell base station 10 hereafter continues the communications with the terminal 13 via the DCH. Meanwhile also, the macrocell base station 10 compares the reception timing of the received signal of the DCH with the reference timing of the self-station, and transmits the timing correction instruction to the terminal 13 by carrying this instruction on the downlink DCH. The continuous synchronization of the uplink wireless line is thus maintained.

Through the process described above, the macrocell base station 10 continuously monitors the RTT of the terminal 13 residing in the macrocell area. The RTT corresponds to a period of reciprocating delay time between the uplink wireless zone and the downlink wireless zone, and one-way delay time may be therefore obtained by RTT/2. The one-way delay time is proportional to a physical distance between the macrocell base station 10 and the terminal 13.

General propagation delay time of radio carrier waves in the air is said to be approximately 5 nsec (nano second) per distance of 1 m. A distance between the base station and the terminal from may be obtained based on the foregoing propagation delay time from the RTT by using the following formula.

Base Station to Terminal Distance=(RTT/2)/5[nsec]    (Formula)

A microcell generally called the picocell is a cell having a cell radius that is several meters through several ten meters. Hence, when the RTT is measured by an oscillation source of, e.g., 20 MHz or thereabouts, the RTT may be determined with accuracy as high as 10 m, and this accuracy is sufficient.

The macrocell base station 10 previously recognizes (stores) geographical locations of the small cell areas existing in the cell area of the self-station. The macrocell base station 10 virtualizes the cell area of the self-station into the virtual areas with the accuracy as high as 10 m, corresponding to the locations of the small cell areas. The area virtualization method is as described above.

The macrocell base station 10 calculates a distance of the terminal 13 residing in the macrocell area through measuring the foregoing RTT, thus specifying the virtual area in which the terminal 13 is located. The macrocell base station 10 manages a locational relation between the virtual area in which the terminal 13 is located and the small cell existing within this virtual area.

The DCH via which to perform the communications with the terminal 13 contains a Dedicated Traffic Channel (DTCH) for storing various items of application data to be provided to a user, and a Dedicated Control Channel (DCCH) for transmitting control information on the radio resource with the user terminal.

The macrocell base station 10 maps the unique "peripheral cell information" on a virtual area basis onto the DCCH, and thus transmits the mapped peripheral cell information to each terminal 13. For example, according to IMT-2000 (International Mobile Telecommunication 2000), the information of the "peripheral cell information" may be transmitted based RRC (Radio Resource Control) protocol. The "peripheral cell information" is mapped to the DCH as an RRC message and thus transmitted to the terminal 13.

The terminal 13 refers to the peripheral cell information, and may execute the cell search based on a downlink carrier frequency and a downlink carrier band width each contained in the peripheral cell information. the macrocell base station 10 does not execute transmitting the RRC message to the terminal 13 with any small cell not existing around, thereby enabling the terminal 13 to restrain the cell search.

[Examples of Configurations of Macrocell Base Station and Terminal]

Described next are examples of configurations of the macrocell base station 10 transmitting the peripheral cell information and the terminal 13 receiving the same information.

<Macrocell Base Station>

Figure 7:
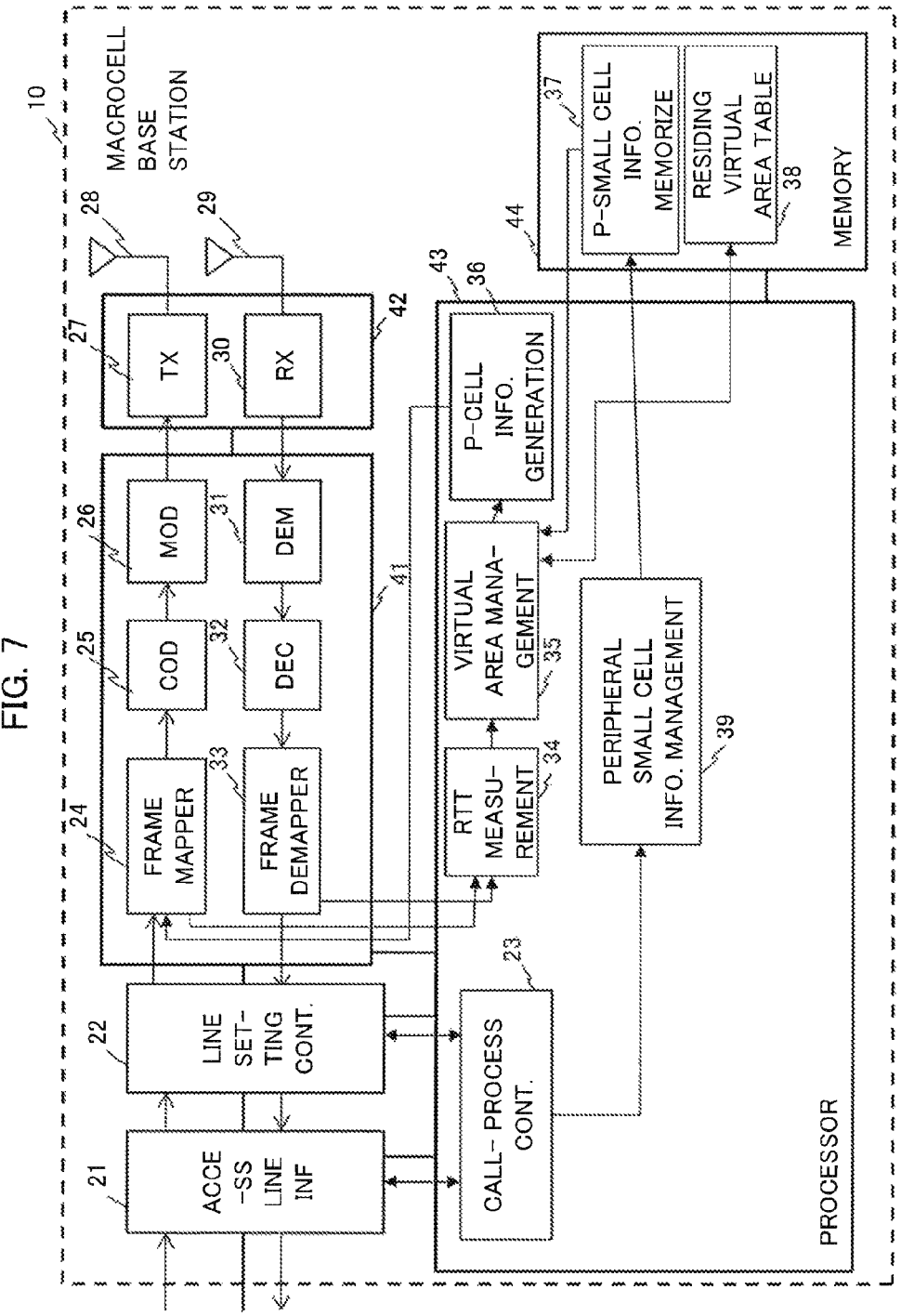
FIG. 7 is a diagram illustrating an example of a configuration of the macrocell base station according to the first embodiment.

FIG. 7 is a view illustrating the example of the configuration of the macrocell base station 10 according to the first embodiment. In FIG. 7, the macrocell base station 10 includes an access line interface (access line INF) 21, and a line setting control apparatus 22.

The access line INF 21 receives the backhaul line connected to other macrocell base stations, the small cell base stations and a host apparatus (instanced by an exchange), and serves to transmit and receive the signals (user data, control data) to and from other base stations and the host apparatus.

The macrocell base station 10 includes a transmission system and a reception system. The transmission system includes a frame mapper 24, a coder (COD) 25, a modulator (MOD) 26, a transmitter (TX) 27 and a transmission antenna 28.

The frame mapper 24 maps the data (the user data, the control data) provided via the line setting control apparatus 22 from the access line INF 21 to a frame having a predetermined format. The coder 25 executes a coding process of the data (frame data) mapped to the frame. The modulator 26 executes a modulation process of the coded frame data. The transmitter 27 performs a D/A conversion of the frame data, an up-conversion into the radio frequency, and amplification thereof. The transmission antenna 28 radiates radio waves of the radio frequency signals (downlink radio signals) toward the cell (sector).

The reception system includes a reception antenna 29, a receiver (RX) 30, a demodulator (DEM) 31, a decoder (DEC) 32 and a frame demapper 33.

The reception antenna 29 receives the radio waves (uplink radio signals) transmitted from the terminal 13. The receiver 30 amplifies, down-converts and A/D-converts the uplink radio signals. The demodulator 31 executes a demodulation process of baseband signals acquired by the A/D conversion. The decoder 32 executes a decoding process of the baseband signals after the demodulation process. The frame demapper 33 takes the data out of the frame. The data is transmitted to the backhaul line (network) from the access line INF 21 via the line setting control apparatus 22.

The macrocell base station 10 further executes call-process control 23, a round trip time (RTT) measuring process 34, a virtual area management process 35, a peripheral cell information generation process 36, and a peripheral small cell information management process 39. The macrocell base station 10 has a storage area 37 for the peripheral small cell information, and a residing virtual area table 38.

The call processing control 23 executes a call process instanced by generating, interrupting and cutting off a call. The line setting control apparatus 22 controls a line connection for the call based on the call process by the call processing control 23. The RTT measuring process 34 measures the RTT of each terminal 13 residing in the macrocell area (the sectors SC1, SC2 and SC3). For measuring the RTT, the RTT measuring process 34 receives the reference timing for transmitting the signal corresponding to the terminal 13 from the frame mapper 24, and receives the reception timing of the signal from the frame demapper 33. The virtual area management process 35 manages an associated relation between the location of each terminal 13 and the predefined virtual area. The peripheral cell information generation process 36 generates the peripheral cell information that is to be provided to each terminal 13. The peripheral small cell information management process 39 manages the small cell information that is stored in the storage area 37 for the peripheral small cell information.

The storage area 37 for the peripheral small cell information stores the small cell information of the small cells existing in the macrocell area (the sectors SC1, SC2 and SC3). The small cell information includes the access information or other equivalent information containing the locational information (latitude, longitude, cell radius and other equivalent data) of the small cell, the uplink (UL) carrier frequency, the downlink (DL) carrier frequency, and UL and DL carrier bandwidths. The small cell information is managed or acquired by the call processing control 23 and stored in the storage area 37 for the peripheral small cell information by the peripheral small cell information management process 39. The call processing control 23 receives the small cell information via the access line INF 21 from the host apparatus, and the acquired small cell information is stored in the storage area 37 for the small cell information. The residing virtual area table 38 stores the information of the terminal 13 located in each virtual area.

The access line INF 21 is formed by use of, e.g., an electric/electronic circuit (hardware) forming an interface circuit. The line setting control apparatus 22 may be formed by using the electric/electronic circuit (hardware) including, e.g., a switch to switch over the line and a controller to control the switchover of the line.

The frame mapper 24, the coder 25, the modulator 26, the demodulator 31, the decoder 32 and the frame demapper 33 may be formed by a digital signal processor (DSP) 41 that executes a program. Note that an entity including respective functions formed by the DSP 41 is generally called a baseband unit.

The transmitter 27 and the receiver 30 are generally called an RF (Radio Frequency) unit being formed by the electric/electronic circuit (hardware: referred to as an "RF circuit 42") including, e.g., a D/A converter, an A/D converter, a frequency conversion circuit (up-converter and down-converter) and an amplifier.

The circuit building up the access line INF 21 is electrically connected to the circuit forming the line setting control apparatus 22. The DSP 41 functioning as the baseband unit is electrically connected to the circuit forming the line setting control apparatus 22 and to the RF circuit 42 building up the RF unit.

The macrocell base station 10 includes a processor 43 and a memory 44 in addition to the access line INF 21, the line setting control apparatus 22, the DSP 41 and the RF circuit 42. The processor 43 is electrically connected to the access line INF 21, the line setting control apparatus 22, the DSP 41 and the memory 44.

The processor 43 is one example of a control apparatus or a controller. For instance, a CPU (Central Processing Unit) and the DSP may be applied as the processor (control apparatus). The memory 44 is one example of a storage device or storage. The memory 44 (storage device) may include a main storage device and an auxiliary storage device. The main storage device includes, e.g., a RAM (Random Access Memory) and a ROM (Read Only Memory). The auxiliary storage device may include a non-volatile storage medium, such as an EEPROM (Electrically Erasable Programmable Read-Only Memory), a flash memory, and a hard disk.

The DSP 41 functioning as the baseband unit may function as the frame mapper 24, the coder 25, the modulator 26, the demodulator 31, the decoder 32 and the frame demapper 33 by executing a variety of programs stored in the memory 44.

The processor 43 performs the RTT measuring process 34, the virtual area management process 35, the peripheral cell information generation process 36, and the peripheral small cell information management process 39 concurrently with executing the call processing control 23 by executing the variety of programs stored in the memory 44.

The memory 44 stores the variety of programs and the data used on the occasion of executing the respective programs. The memory 44 may have the peripheral small cell information storage area 37 and the residing virtual area table 38.

The foregoing hardware configuration of the macrocell base station 10 is an exemplification. Each of the frame mapper 24, the coder 25, the modulator 26, the demodulator 31, the decoder 32 and the frame demapper 33, which are the functions possessed by the DSP 41, may be attained by at least one dedicated or general-purpose electric/electronic circuit (e.g., an integrated circuit instanced by IC, LSI, ASIC), or a programmable logic device (PLD) instanced by an FPGA (Field Programmable Gate Array).

Similarly, each of the functions possessed by the processor 43 may be implemented by using at least one of the hardware components instanced by the integrated circuit and the PLD, the functions being the call processing control 23, the RTT measuring process 34, the virtual area management process 35, the peripheral cell information generation process 36 and the peripheral small cell information management process 39.

The discussion made so far by using FIG. 7 describes, in the macrocell base station 10, the example of the configuration corresponding to one of the plurality of sectors formed by the macrocell base station 10, but FIG. 7 omits illustrations of configurations corresponding to remaining sectors. The configuration illustrated in FIG. 7, i.e., the configuration provided per sector may be applied as an actual configuration of the macrocell base station 10.

However, software may be installed so that the single DSP 41 or processor 43 executes processes for the plurality of sectors. Such a configuration may be also therefore applied that the macrocell base station 10 includes one set of the DSP 41, the processor 43 and the memory 44, which are shared among the sectors. In a configuration of implementing a plurality of DSPs 41 and a plurality of processors 43, the memory 44 may be used in common. The storage area 37 for the peripheral cell information and the residing virtual area table 38 store the information unique to each sector and also contents in common among the sectors, and may be shared among the sectors.

For simplifying the description, the following discussion will describe an example that the macrocell base station 10 includes the functions depicted in FIG. 7 per sector. Note that the method of notifying the peripheral cell information different per sector, which has been described in the reference example, is attained as below in the configuration of the macrocell base station 10 depicted in FIG. 7.

For example, in the call processing control 23 provided per sector, the processor 43 acquires the small cell information of the small cells located in the corresponding sector from the host apparatus, and the peripheral small cell information management process 39 stores the small cell information in the storage area 37 for the peripheral cell information. The location of the terminal 13 is registered per sector, and hence the macrocell base station 10 may specify which sector of the sectors S1-S3 the terminal 13 resides (is located) in through, e.g., a location registration procedure. Then, the processor 43 generates the peripheral cell information corresponding to the sector in the peripheral cell information generation process 36, and supplies the generated information to the frame mapper 24. The transmission system is provided per sector, and the downlink radio signal containing the peripheral cell information is therefore transmitted from the transmission antenna 28 toward the corresponding sector. Such a process is executed per sector, thereby enabling the notification of the information (the cell search information) of the small cells located in the relevant sector to each sector.

<Example of Configuration of Terminal>

Figure 8:
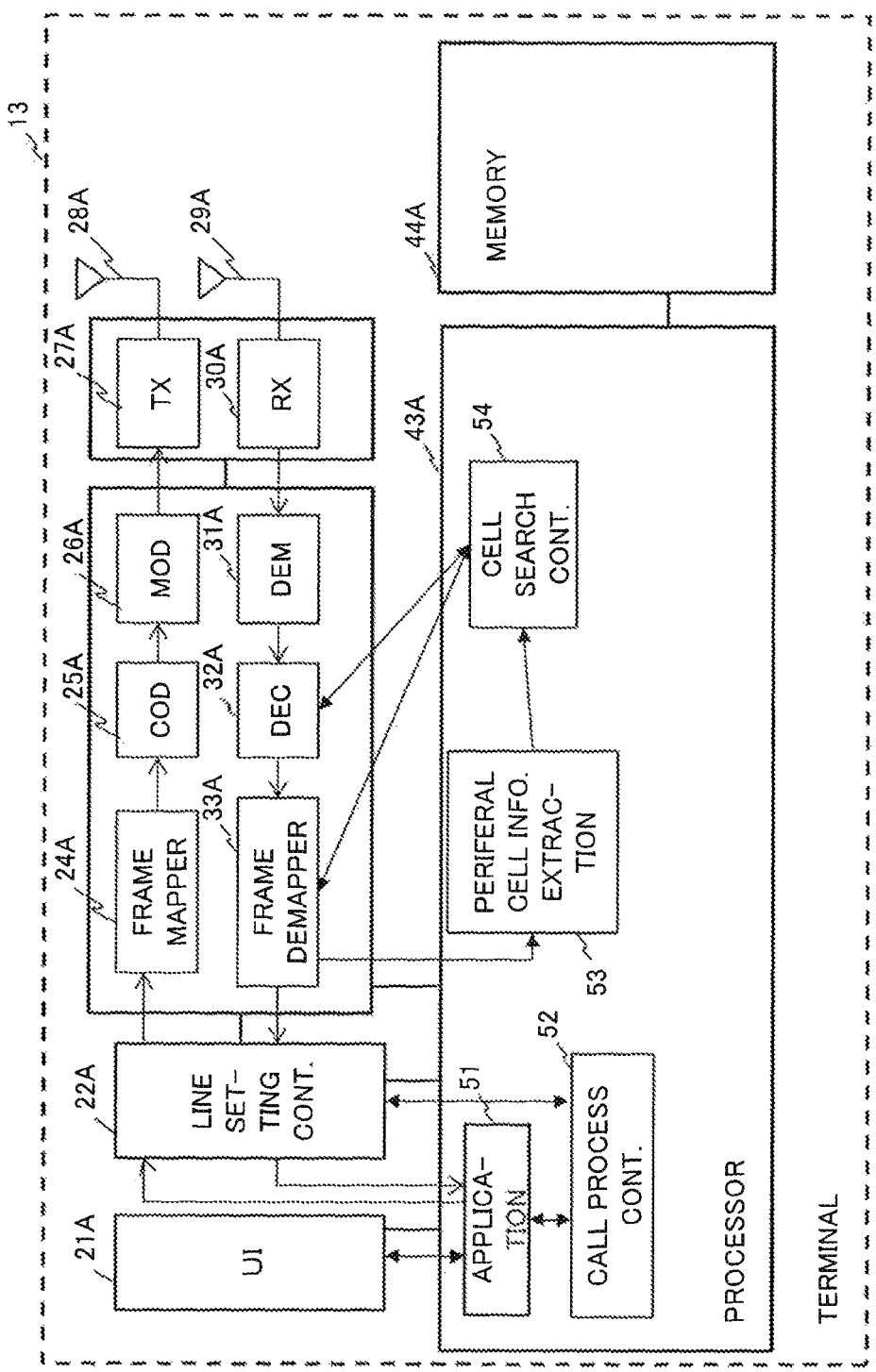
FIG. 8 is a diagram illustrating an example of a configuration of a terminal according to the first embodiment.

FIG. 8 depicts an example of a configuration of the terminal 13 according to the first embodiment. In FIG. 8, the terminal 13 includes a user interface (UI) 21A and a line setting control apparatus 22A. The UI 21A includes input apparatuses (buttons, keys, a microphone, a touch panel, and other equivalent components) and output apparatuses (a display apparatus, a speaker, and other equivalent components) of the data or the information.

The terminal 13 further includes a transmission system and a reception system similarly to the macrocell base station 10. The transmission system includes a frame mapper 24A, a coder (COD) 25A, a modulator (MOD) 26A, a transmitter (TX) 27A and a transmission antenna 28A. The reception system includes a reception antenna 29A, a receiver (RX) 30A, a demodulator (DEM) 31A, a decoder (DEC) 32A and a frame demapper 33A.

Functions of respective blocks included in the transmission system and the reception system of the terminal 13 are the same as those of the transmission system and the reception system equipped in the macrocell base station 10, and hence the repetitive explanations thereof are omitted. However, the transmission antenna 28A transmits the uplink radio signal toward the base station, while the reception antenna 29A receives the downlink radio signal from the base station.

The frame mapper 24A, the coder (COD) 25A, the modulator (MOD) 26A, the demodulator (DEM) 31A, the decoder (DEC) 32A and the frame demapper 33A are functions acquired by a DSP 41A executing the programs similarly to the macrocell base station 10. The transmitter 27A and the receiver 30A are attained by a RF circuit 42A.

However, the function of each of the frame mapper 24A, the coder (COD) 25A, the modulator (MOD) 26A, the demodulator (DEM) 31A, the decoder (DEC) 32A and the frame demapper 33A, may be attained by using one or more electric/electronic circuits and PLDs.

The terminal 13 further includes a processor 43A and a memory 44A. The memory 44A stores the variety of programs executed by the DSP 41A and the processor 43A and the data used on the occasion of running the respective programs. The processor 43A carries out a process based on an application 51 by running the programs stored in the memory 44A, and executes call processing control 52, a peripheral cell information extraction process 53 and cell search control 54.

The application 51 provides the user with a variety of functions attained by executing the application programs stored in the memory 44A. The application 51 provides the information to the user via the UI 21A, or the information and the data are inputted to the application 51 via the UI 21A.

The call processing control 52 executes the call process through the input from the application 51. For example, the call processing control 52 executes an originating process and a cut-off process of receiving origination and cut-off inputted by the user from the UI 21A via the application 51 with respect to a communication target terminal. For instance, the application 51 issues an origination instruction corresponding to the input of the origination from the UI 21A. The call processing control 52 sets a line corresponding to the origination instruction in the line setting control apparatus 22A. The application 51 sends a message (originating signal) in response to the input of the origination to the line setting control apparatus 22A, and the line setting control apparatus 22A connects the originating signal to the frame mapper 24A.

Thereafter, e.g., the application 51, when receiving a calling message or an incoming call response message via the line setting control apparatus 22A from the frame demapper 33A, outputs a voice/sound or displays information about the calling or the response to the incoming call to the UI 21A.

The peripheral cell information extraction process 53, when receiving the notifying information containing the peripheral cell information by the reception antenna 29A, receives the notifying information from the frame demapper 33A, and extracts the peripheral cell information contained in the notifying information. The cell search control 54, when the peripheral cell information contains the information of the small cell existing in the sector in which the terminal 13 is located, conducts the cell search control based on the information of the small cell with respect to the frame demapper 33A and the decoder 32A. The cell search control 54 performs, with respect to the decoder 32A and the frame demapper 33A, the control for detecting the signal having the downlink carrier frequency and the downlink carrier bandwidth contained in the information of the small cell.

Note that the respective functions carried out by the application 51, the call processing control 52, the peripheral cell information extraction process 53 and the cell search control 54 may also be attained by the dedicated or general-purpose circuits and the PLDs (hardware).

[Processing Examples of Macrocell Base Station and Terminal]

<Processing Example of Macrocell Base Station>

Figure 9:
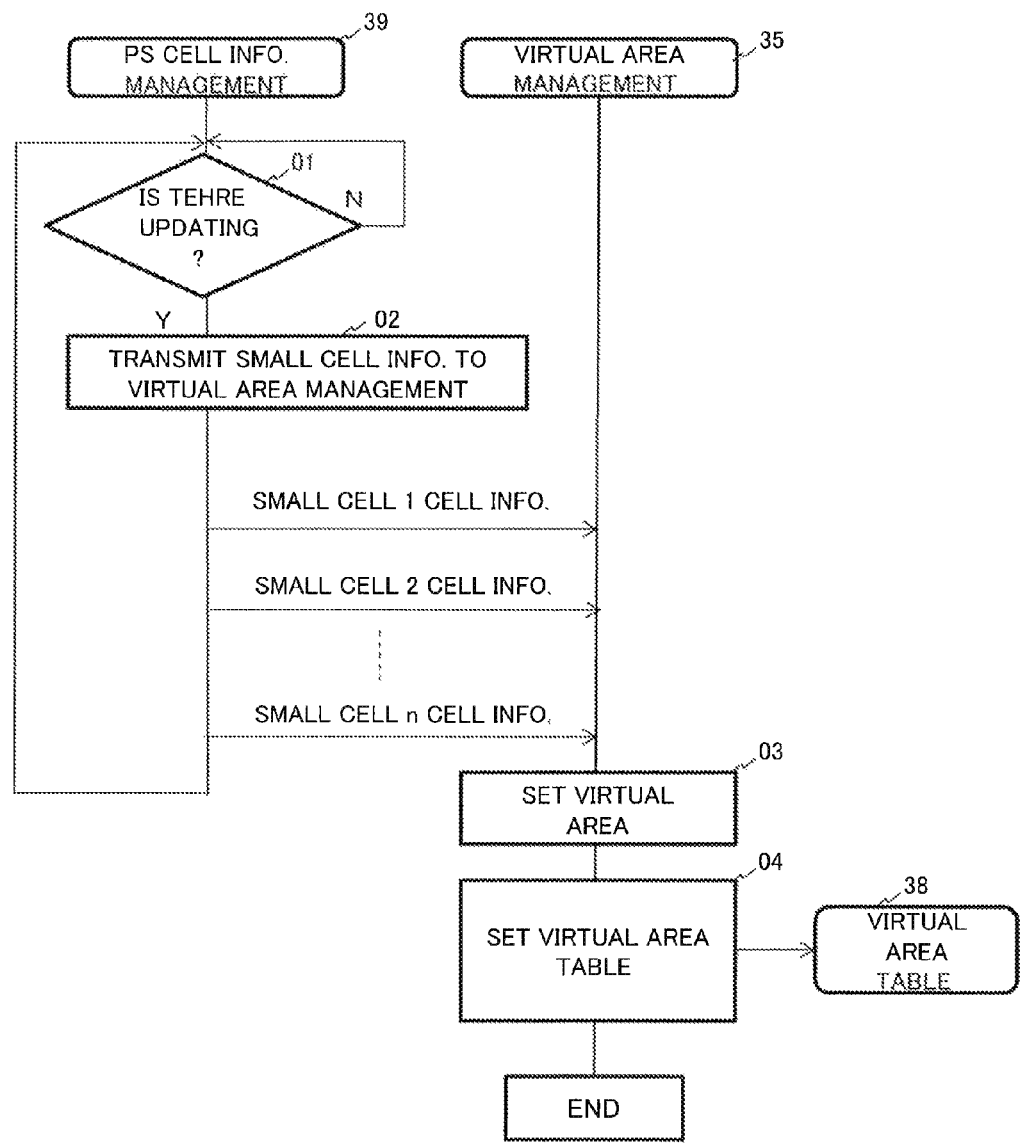
FIG. 9 is a flowchart illustrating a processing example of generating virtual area information in the macrocell base station depicted in FIG. 7.

FIG. 9 is a flowchart illustrating a processing example of generating virtual area information in the macrocell base station 10 depicted in FIG. 7. Processes illustrated in FIG. 9 are executed per sector. In FIG. 9, the processor 43, when the peripheral small cell information management process 39 updates the contents stored in the storage area 37 for the peripheral small cell information (which will hereinafter be simply termed the storage area 37) (01, Yes), transmits the small cell information stored in the storage area 37 to the virtual area management process 35 (02).

The small cell information (n-pieces of small cell information ("n" being a natural number)) stored in the storage area 37 is handed over to the virtual area management process 35 in 02.

The processor 43 operating as the virtual area management process 35 executes a setting process of the virtual area (03). For example, when the virtual area management process 35 is given the small cell information of the small cell SC1 about the sector S1 depicted in FIG. 5, the processor 43 calculates, for the virtual area management process 35, the virtual area VA-A, the virtual area VA-B and the virtual area VA-C by using the information (of the sector S1) of the base station area that is previously stored in the memory 44 and the information of the small cell SC1 (see FIG. 5). The sector (macrocell) is thereby divided into two or more virtual areas.

Subsequently, the processor 43 operating as the virtual area management process 35 generates the pieces of virtual area information representing the virtual area VA-A, the virtual area VA-B and the virtual area VA-C each being set in the sector S1, and stores the generated virtual area information in the residing virtual area table 38 by being associated with the small cell information of the small cells located in the virtual areas specified by the virtual area information (04).

The residing virtual area table 38 in 04 stores an associated relation between the pieces of information representing the virtual area VA-A, the virtual area VA-B and the virtual area VA-C and the small cell information with respect to the sector S1. In the example illustrated in FIG. 5, the small cell information of the small cell SC1 is stored by being associated with the virtual area information of the virtual area VA-B.

Figure 10:
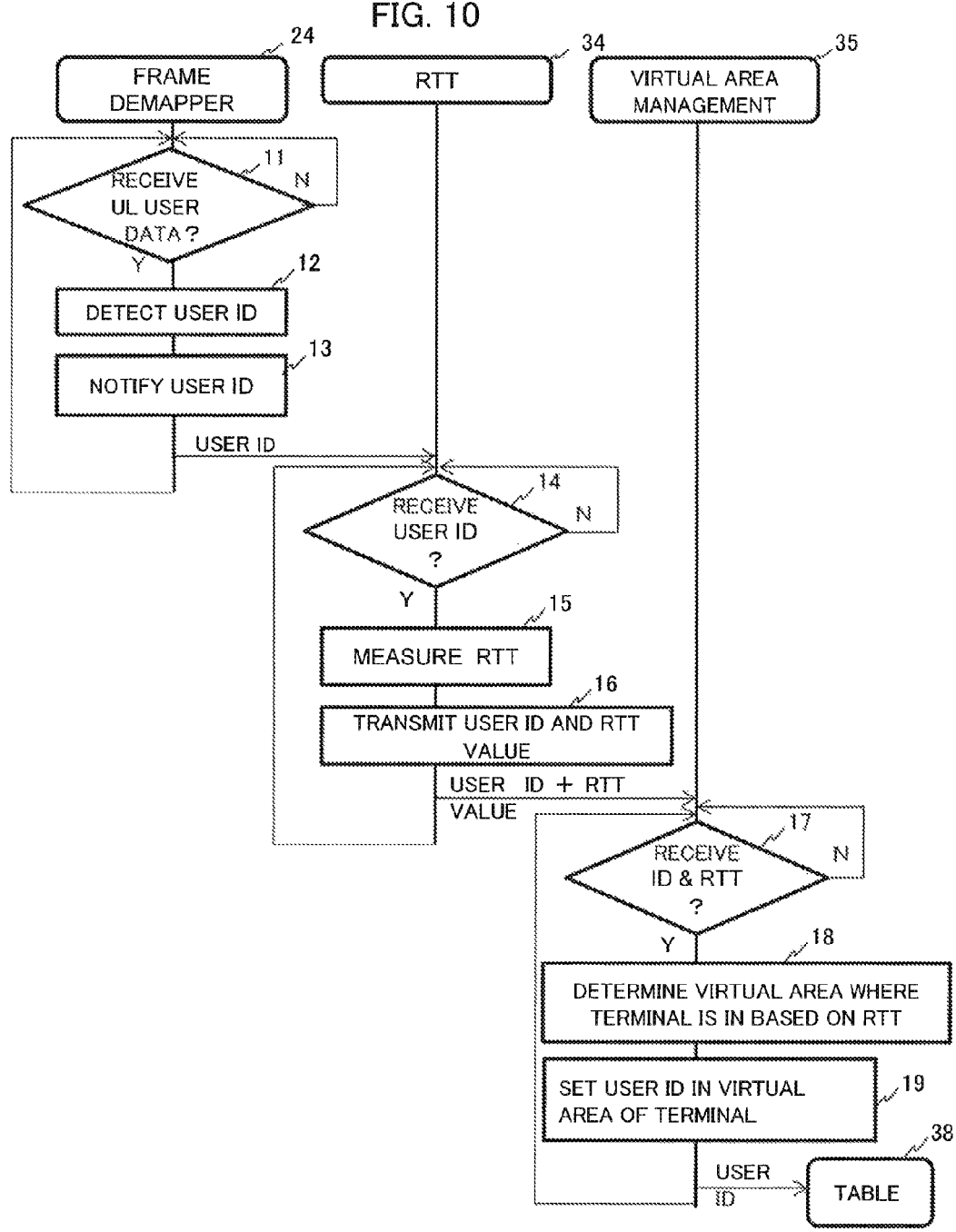
FIG. 10 is a flowchart illustrating a processing example related to notification of peripheral cell information in the macrocell base station depicted in FIG. 7.

FIG. 10 is a flowchart illustrating a processing example in the macrocell base station 10 depicted in FIG. 7. A start of processes depicted in FIG. 10 is triggered by en event that the frame demapper 33 (DSP 41) included in the reception system receives the uplink user data (11, Yes).

The frame demapper 33 detect the user ID contained in the uplink user data, i.e., detects identifying information of the terminal 13 (12). The frame demapper 33 notifies the user ID to the RTT measuring process 34 of the processor 43 (13).

The processor 43 operating as the RTT measuring process 34, upon receiving the user ID (14, Yes), measures the RTT based on transmitting an receiving the signal (e.g., the RACH signal) to and from the terminal 13 specified by the user ID (15). Subsequently, the processor 43 transmits the user ID and the RTT value to the virtual area management process 35 (16).

Thereupon, the processor 43 carries out the virtual area management process 35. To be specific, upon receiving the user ID and the RTT value (17, Yes), the processor 43 determines based on the RTT which virtual area the terminal 13 resides (is located) in (18). Then, the processor 43 stores, based on a result of the determination, the user ID in the residing virtual area table 38 by being associated with the virtual area information of the virtual area in which the terminal 13 resides (19).

The processes depicted in FIG. 10 are executed whenever receiving the uplink user data from the terminal 13 residing in a specified sector (e.g., the sector S1). Each terminal 13 residing in the specified sector is thereby associated with any one of the virtual areas, based on the RTT value thereof. In other words, the virtual area information of the virtual area, in which each terminal 13 resides, is stored in the residing virtual area table 38.

FIG. 11 schematically illustrates a data structure of the residing virtual area table 38 generated with respect to the sector S1. The residing virtual area table 38 has, as illustrated in FIG. 11, e.g., a plurality of fields (one record: entries of columns) prepared per virtual area. Each record may have a plurality of fields, i.e., a "virtual area identifying information" field, a "virtual area information" field, a "small cell information" field and a "residing user ID" field for registering data values thereof.

The virtual area identifying information and the virtual area information are generated in the process "03" (FIG. 9) and stored in the process "04". The small cell information stored in the storage area 37 is registered in the "small cell information" field by being associated with the virtual area. The user ID of the terminal 13 is registered by being associated with the virtual area in which the terminal 13 resides. The example of FIG. 11, as depicted in FIG. 6, illustrates such a status as to register the user ID of the terminal 13a located in the virtual area VA-C.

Figure 12:
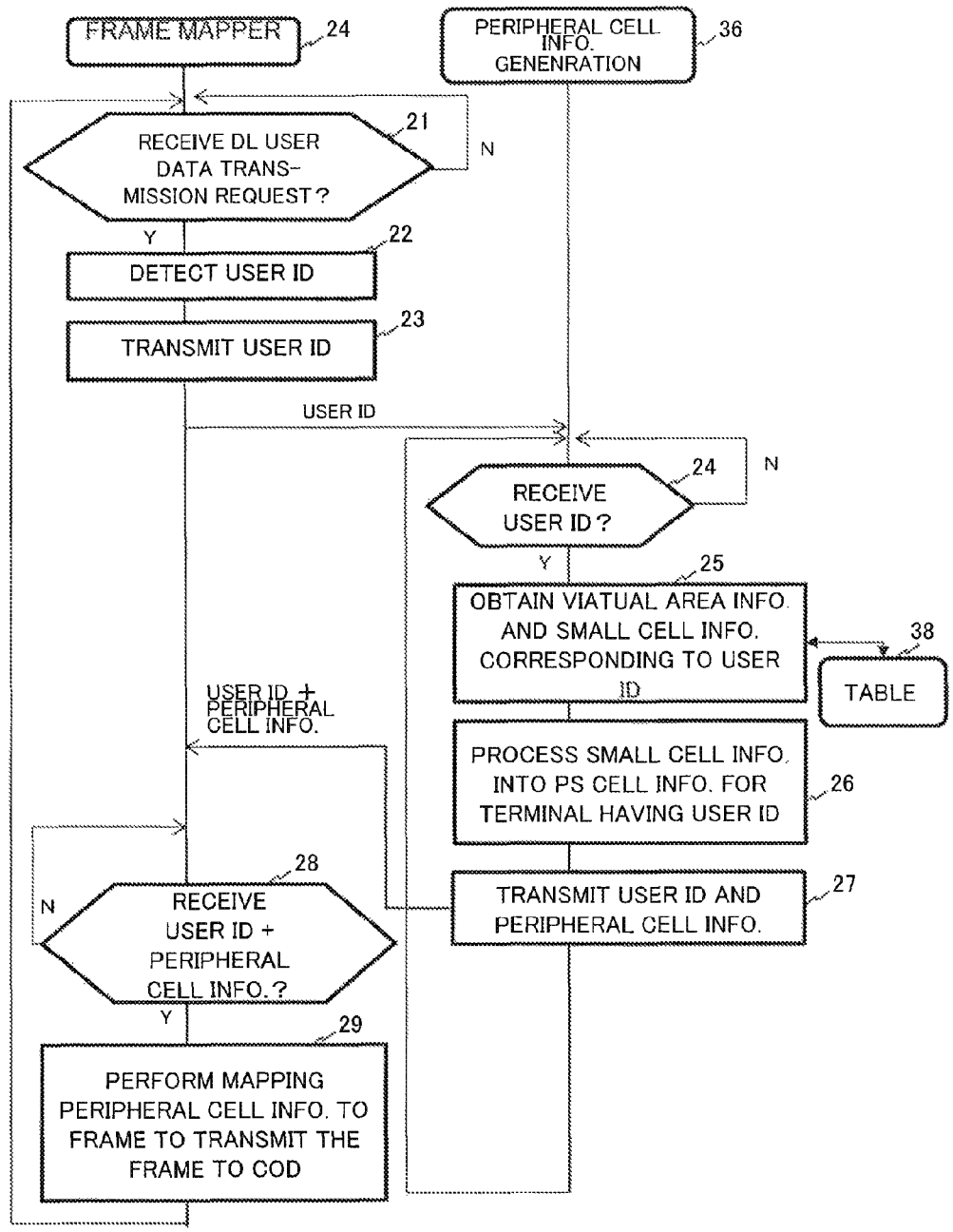
FIG. 12 is a flowchart illustrating a processing example related to a cell search for a small cell in the macrocell base station depicted in FIG. 7.

FIG. 12 is a flowchart illustrating a processing example in the macrocell base station 10 depicted in FIG. 7. A start of processes depicted in FIG. 12 is triggered by an event that the frame mapper 24 made to function by the DSP 41 detects a request for transmitting the downlink user data to a specified terminal 13 (21, Yes).

The frame mapper 24 detects the user ID (i.e., the identifying information of the terminal 13) contained in the downlink user data transmission request (22). Subsequently, the frame mapper 24 notifies the user ID to the peripheral cell information generation process 36 (23).

The processor 43, as triggered by receiving the user ID (24, Yes), executes the peripheral cell information generation process 36 as follows. To be specific, the processor 43 refers to the residing virtual area table 38, and thus reads the small cell information associated with the user ID from the residing virtual area table 38 (25).

Subsequently, the processor 43 processes the acquired small cell information into the peripheral cell information for the terminal 13 having the user ID (26). Then, the processor 43 transmits the user ID and the peripheral cell information to the frame mapper 24 (27).

The frame mapper 24, upon receiving the user ID and the peripheral cell information (28, Yes), performs a process of mapping the peripheral cell information to the frame, and transmits the frame to the coder (COD) 25 (29). The peripheral cell information is thus transmitted as the downlink signal from the transmission antenna 28 through the processing by the transmission system, and is received by the target terminal 13.

Figure 13:
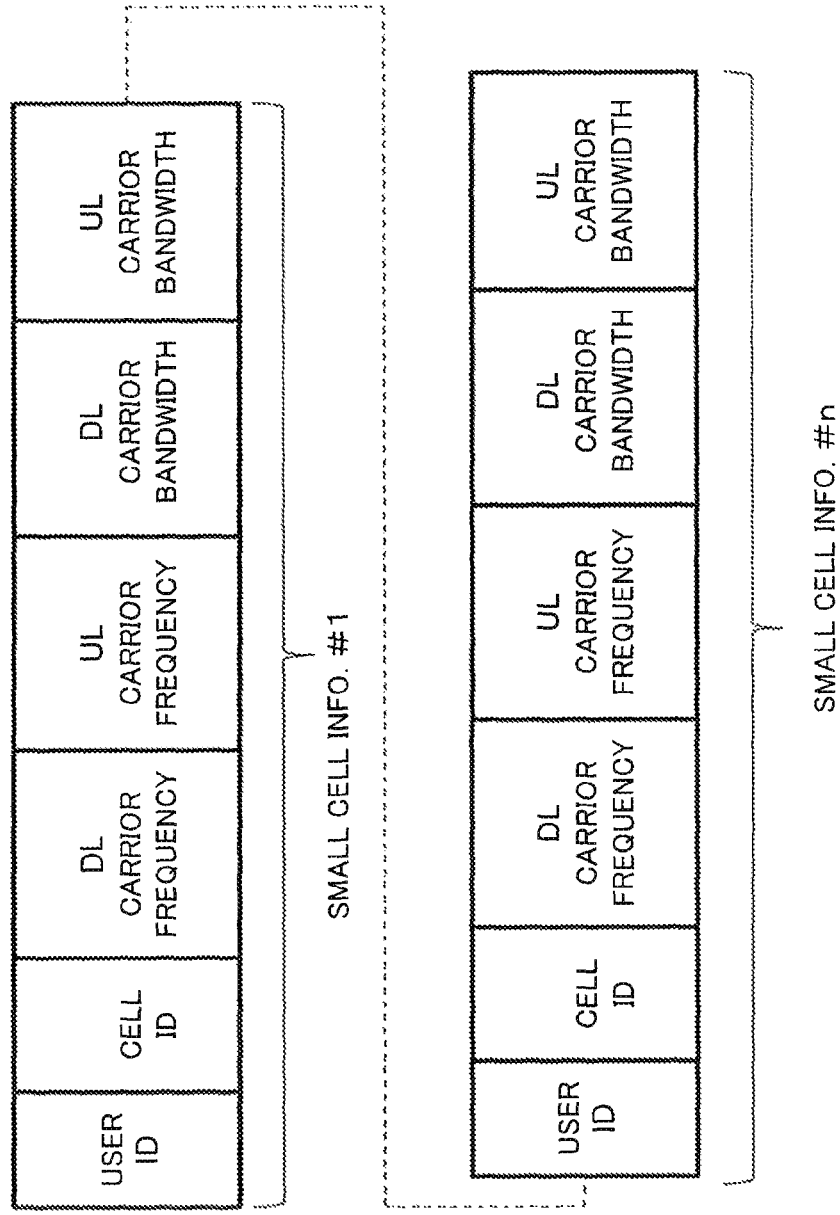
FIG. 13 schematically illustrates a message containing a user ID and the peripheral cell information, which are transmitted to the terminal 13.

FIG. 13 schematically illustrates a message containing the user ID and the peripheral cell information that are transmitted to the terminal 13 through the process "29". As in FIG. 13, the message contains the user ID and the small cell information of one or more small cells located in the residing virtual area. The small cell information contains, as depicted in FIG. 13, at least a cell ID of the small cell, a downlink (DL) carrier frequency, an uplink (UL) carrier frequency, a downlink carrier bandwidth and an uplink carrier bandwidth. When the plurality of small cells is located in one virtual area, the respective items of small cell information of all of the small cells located within the virtual area are mapped to the message.

<Processing Example of Terminal>

Figure 14:
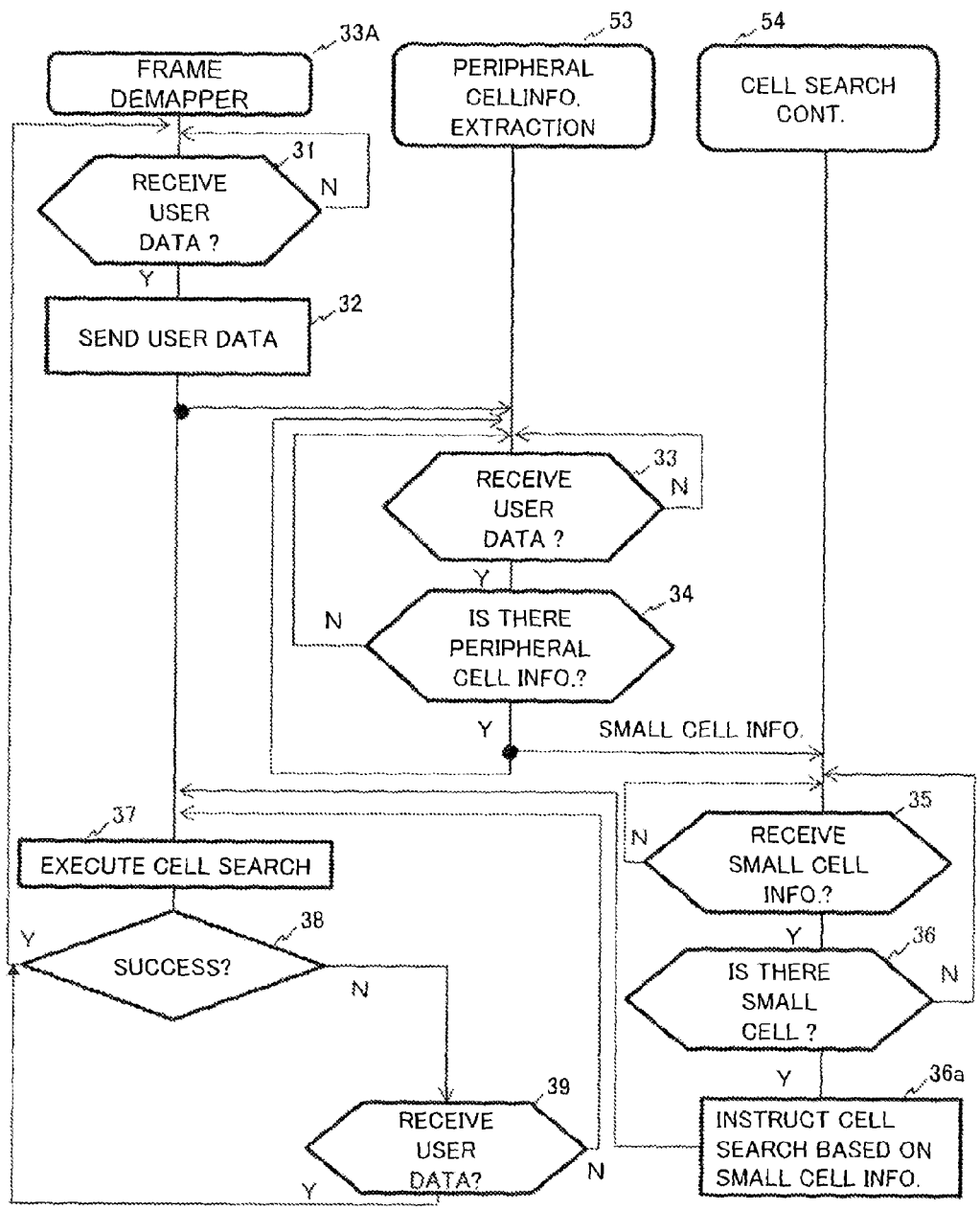
FIG. 14 is a flowchart illustrating a processing example of the terminal according to the first embodiment.

FIG. 14 is a flowchart illustrating a processing example in the terminal 13 depicted in FIG. 8. A start of processes depicted in FIG. 14 is triggered by an event that, e.g., a frame demapper 33A as one of functions of a DSP 41A receives the user data obtained by the reception system and directed to the self-station (31).

The frame demapper 33A, upon starting the processes, transmits the user data to the peripheral cell information extraction process 53 (32). The processor 43A operating as the peripheral cell information extraction process 53 executes following processes "33" and "34". Specifically, the processor 43A, upon receiving the user data (33, Yes), determines whether the user data contains the peripheral cell information or not (34). Hereat, when the peripheral cell information is not contained therein (34, No), the processing loops back to the process "33". Whereas when the peripheral cell information is contained therein (34, Yes), the processor 43A transmits the small cell information of the peripheral cell information to the cell search control 54.

The processor 43A, as triggered by receiving the small cell information (35, Yes), operates as the cell search control 54 to execute the following processes. To be specific, the processor 43A determines whether the small cell information contains the information of the small cell located in the virtual area or not (36). Hereat, when the small cell information indicates that the any small cell does not exist in the virtual area, the processing loops back to the process "35". Consequently, the process "37", i.e., the cell search is not carried out. Accordingly, the cell search in the terminal 13 is avoided. This avoidance enables the cell search exhibiting a low success rate to be avoided and the electric power to be restrained from wasting.

Whereas when the small cell information indicates that the small cell is located in the virtual area, the processor 43A instructs the frame demapper 33A and the decoder (DEC) 32A to conduct the cell search for detecting the signals having the downlink carrier frequency and the downlink bandwidth, which are contained in the small cell information (36).

The frame demapper 33A executes the cell search together with the decoder 32A (37). Then, when the cell search becomes successful, i.e., when the target signal may be received from the small cell (38, Yes), the processing loops back to the process "31". Conversely when failing in the cell search (38, No), the processor 43A determines whether the user data directed to the self-station is received or not (39). When receiving the user data directed to the self-station (39, Yes), the processing loops back to "31". Whereas when not receiving the user data directed to the self-station (39, No), the processing loops back to "37", and the cell search is retried (Retry).

When the cell search becomes successful, the terminal 13 executes a process for migrating to the small cell (small cell base station), i.e., a procedure in which the terminal wirelessly connects to the small cell base station. The terminal 13 is thereby enabled to receive the communication services through the wireless communications with the small cell base station.

Effect of First Embodiment

According to the first embodiment, the macrocell is divided into the plurality of virtual areas, and the virtual area, in which the terminal 13 residing in the macrocell is located, is specified based on the RTT value. Then, the peripheral cell information for the terminal 13 is generated and provided to the terminal 13. The terminal 13 is thereby enabled to execute the cell search for the small cell under the environment with an enhanced probability of succeeding in the cell search for the small cell. Hence, the electric power may be restrained from wasting in the cell search for the small cell, and it is feasible to avoid running out of battery at the early stage.

Note that a following configuration may be applied in place of the configuration of the first embodiment described above. To be specific, the virtual areas are dynamically generated based on the small cell information by the virtual area management process in the first embodiment, and, however, previously generated items of virtual area information may be statically stored in the memory 44.

Second Embodiment

Next, a discussion on a second embodiment will be made. The second embodiment has a configuration being partly common to the first embodiment, and therefore the discussion will be focused on different points, while omitting the explanations of common points thereof.

Generally, a status (wireless environment) in the wireless zone between the terminal and the base station dynamically varies on a time base. For example, the wireless environment between the terminal located in a certain position and the base station is satisfactory in a certain time zone, in which the cell search may be properly carried out. By contrast, in a different time zone, the wireless environment is deteriorated due to an interference source and an obstacle that are temporarily caused between the terminal and the base station, resulting in a failure of the cell search as the case may be.

Figure 15:
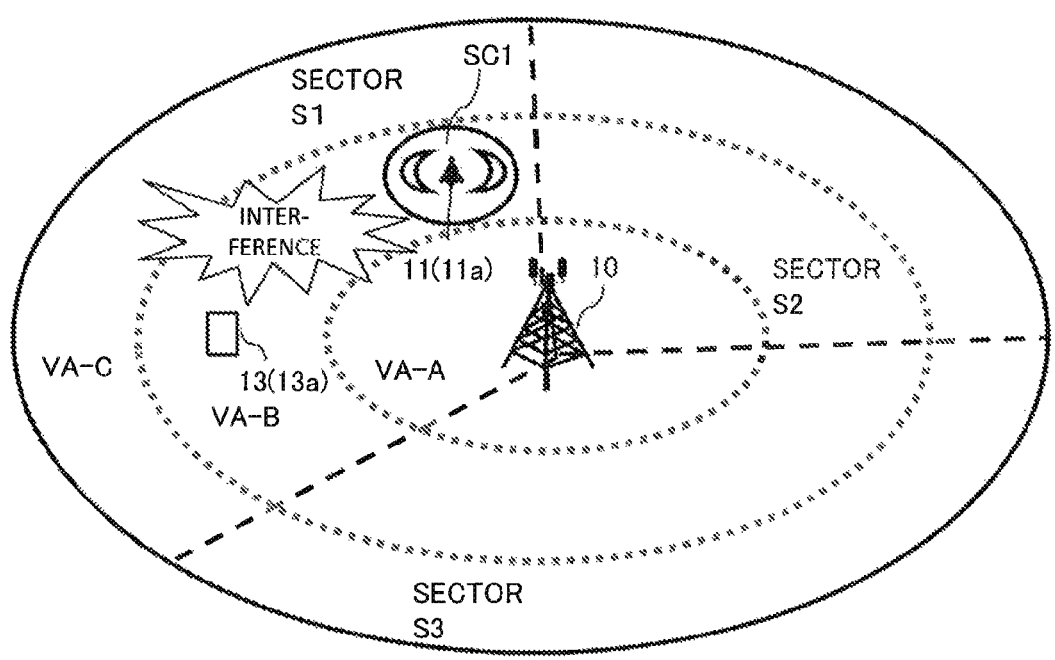
FIG. 15 is an explanatory view of the mobile communication system according to a second embodiment.

FIG. 15 is an explanatory view of the mobile communication system according to the second embodiment. For example, an assumption is that the terminal 13a located in the virtual area VA-B of the sector S1 performs the cell search for the small cell SC1 located in the virtual area VA-B, based on the peripheral cell information received from the macrocell base station 1, by the method described in the first embodiment.

Hereat, as illustrated in FIG. 15, when the temporary interference source exists between the terminal 13a and the small cell SC1, the terminal 13a is disabled from suitably receiving the radio waves from the small cell SC1, which leads to a possibility of failing in the cell search. For instance, the wireless environment has initially none of obstacles against the radio waves, and nevertheless, when a large-scaled temporary building is constructed for an event, it is considered that the wireless environment will be deteriorated till removing the temporary building.

Under the deteriorated wireless environment, as a consequence of the terminal 13 repeating the cell search, the electric power wastes, resulting in likelihood of running out of battery at the early stage. The second embodiment will describe the macrocell base station and the terminal, which have configurations to solve these problems.

The second embodiment involves performing the following procedures between the macrocell base station and the terminal in addition to the configuration described in the first embodiment.

(A) The macrocell base station 10 instructs the terminal to conduct the cell search for the small cell, and stores the identifying information (terminal ID, which corresponds to the user ID) of the instructed terminal.

(B) The terminal, when failing in the cell search for the small cell due to the temporary interference source, notifies the success/failure information indicating the failure in the cell search to the macrocell base station via the uplink wireless zone.

(C) The macrocell base station, when receiving the information indicating the failure in the cell search from the terminal having the stored terminal ID, counts a cell search failure count by being associated with the virtual area in which the terminal resides.

(D) The macrocell base station continues counting the cell search failure count in the virtual area whenever receiving the information indicating the failure in the cell search. The counting is performed for a predetermined period of time (approximately one hour is given as one instance). When the failure count within the predetermined period of time exceeds a threshold value, there is carried out control for temporarily inhibiting the terminal residing in the virtual area (for causing the terminal to avoid performing the cell search) from performing the cell search for the small cell from that point of time.

(E) The temporary inhibition of the cell search is cancelled corresponding to an elapse of a predetermined period of cancellation time, and the procedures (A)-(D) are iterated.

Figure 16:
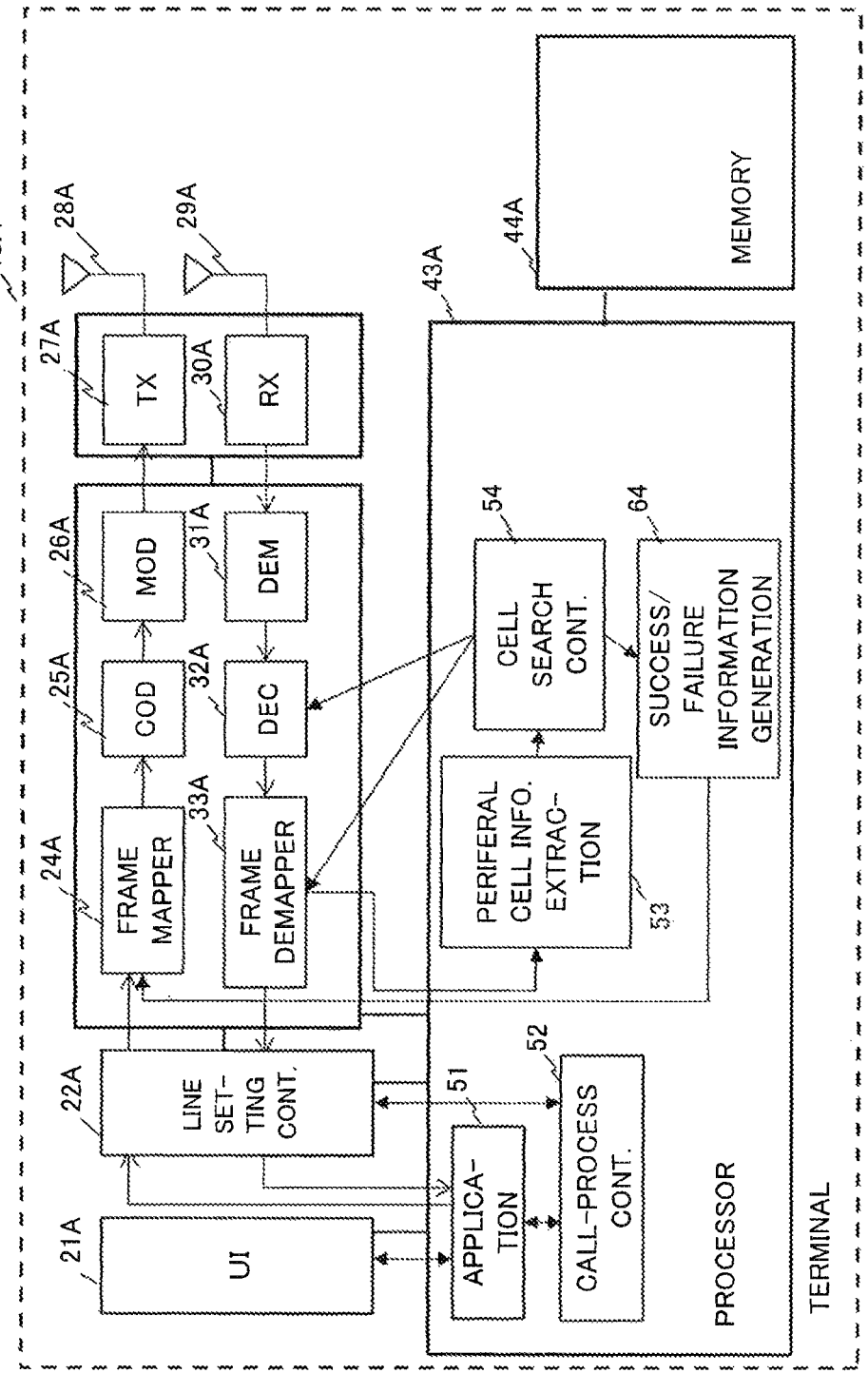
FIG. 16 illustrates an example of a configuration of the terminal according to the second embodiment.

FIG. 16 illustrates an example of a configuration of the terminal (terminal 13A) according to the second embodiment. The terminal 13A further includes a configuration for executing the procedure (B) in addition to the configuration (FIG. 8) of the terminal 13 in the first embodiment.

Specifically, the processor 43A operating as the peripheral cell information extraction process 53 receives the peripheral cell information as the cell search instruction. The processor 43A operating as the cell search control 54 controls the decoder 32A and the frame demapper 33A for the cell search. These processes are the same as those in the first embodiment. The processor 43A may receive the result (the success (OK) or the failure (NG) of the cell search) of the cell search executed by the decoder 32A and the frame demapper 33A.

The processor 43A of the terminal 13A further executes a success/failure information generation process 64 by running the program stored in the memory 44A. The success/failure information generation process 64 generates the success/failure information indicating the success (OK) or the failure (NG) of the cell search for the small cell. The success/failure information is sent to and mapped by the frame mapper 24, and is transmitted to the macrocell base station (10A) according to the second embodiment. The procedure (B) is thus carried out. The terminal 13A has the same configuration as the terminal 13 has, except the points described above, and hence the repetitive explanations are omitted.

Figure 17:
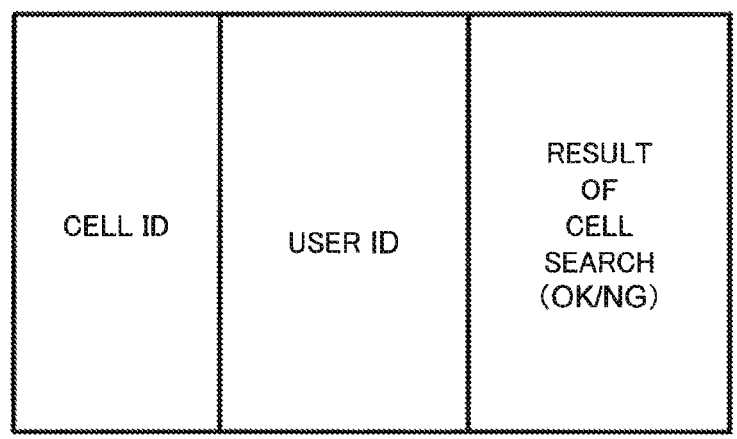
FIG. 17 illustrates an example of a message containing success/failure information transmitted to the macrocell base station.

FIG. 17 illustrates an example of a message containing the success/failure information transmitted to the macrocell base station 10A. The success/failure information contains a cell ID of the small cell, a user ID (the identifying information (called also a terminal ID) of the terminal 13A) and cell search success/failure information, i.e., the information indicating a result (success or failure) of the cell search.

Figure 18:
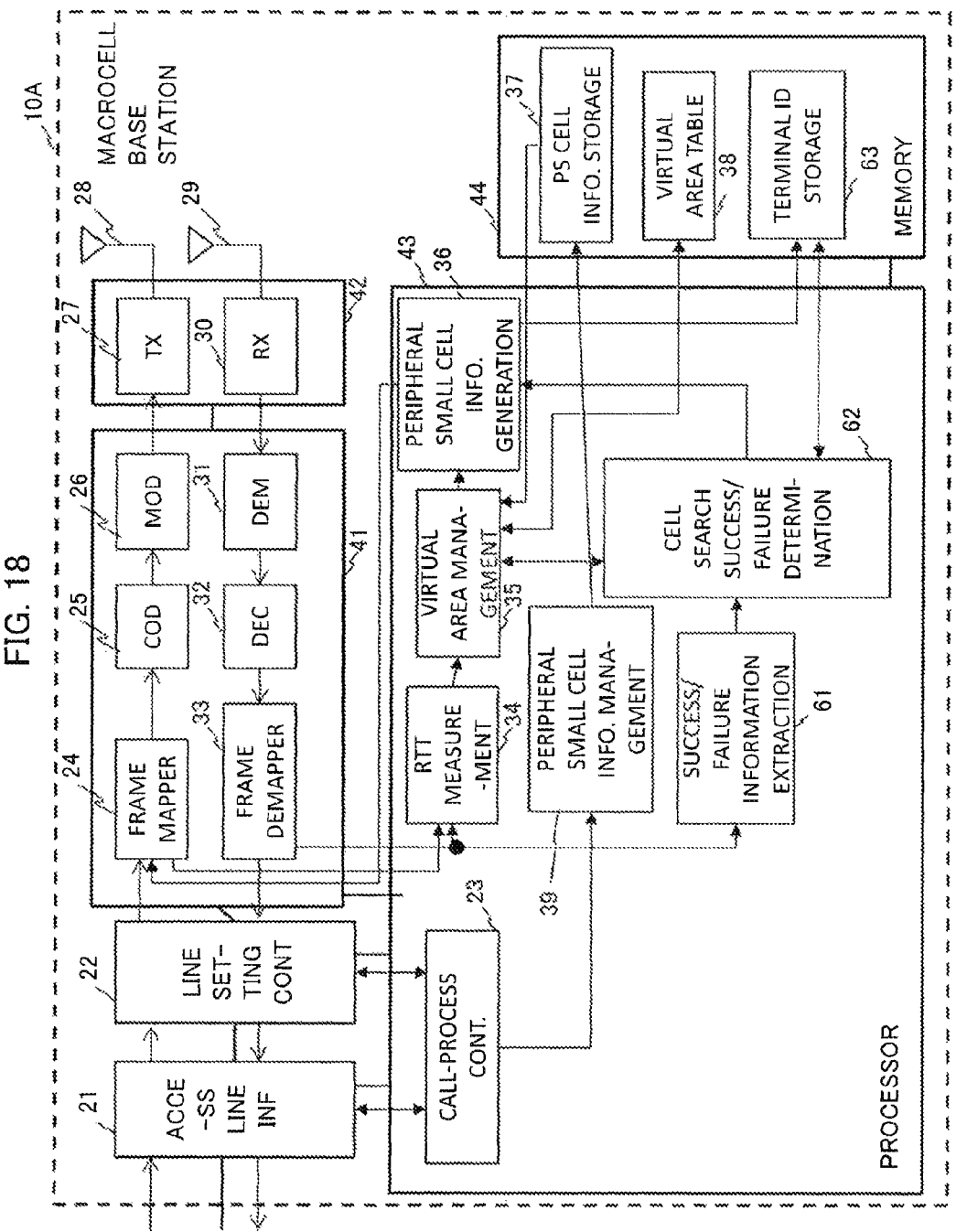
FIG. 18 illustrates an example of a configuration of the macrocell base station according to the second embodiment.

FIG. 18 depicts an example of a configuration of the macrocell base station 10A according to the second embodiment. The macrocell base station 10A further includes a configuration for carrying out the procedures (A), (C)-(E) in addition to the configuration (FIG. 7) of the macrocell base station 10 according to the first embodiment.

To be specific, the processor 43 further executes a success/failure information extraction process 61 and a cell search success/failure determination process 62 by running the program. Moreover, the memory 44 is provided with a cell search instructed terminal ID storage area 63 (which will hereinafter be simply termed the "storage area 63").

The user ID (terminal ID) of the terminal 13 is stored in the storage area 63, the terminal 13 corresponding to a transmission destination of the peripheral cell information when the processor 43 operating as the peripheral cell information generation process 36 generates the peripheral cell information corresponding to the cell search instruction. The procedure (A) is thus conducted.

The processor 43 operating as the success/failure information extraction process 61 receives the message (FIG. 17) of the success/failure information from the frame demapper 33, and extracts the user ID and the success/failure information. Further, the processor 43 operating as the cell search success/failure determination process 62 determines whether the cell search for the small cell located in the virtual area in which the terminal 13A having the user ID is located, is inhibited, the determination being made based on the user ID and the success/failure information extracted by the success/failure information extraction process 61, the contents stored in the residing virtual area table 38 supplied through the virtual area management process 35, and the terminal ID stored in the storage area 63.

The processor 43 operating as the peripheral cell information generation process 36 generates the peripheral cell information (i.e., the cell search instruction) reflective of the determination result by the cell search success/failure determination process 62. Specifically, when the determination result indicates permission of the cell search (when the small cell exists in the virtual area), there is generated the peripheral cell information containing the small cell information used for the terminal 13A to perform the cell search. Whereas when the determination result indicates the inhibition of the cell search, there is generated the peripheral cell information used for the terminal 13A to avoid the cell search. The peripheral cell information is, similarly to the first embodiment, transmitted to the terminal 13A having the user ID. The procedures (C) and (D) are thus carried out.

Figure 19:
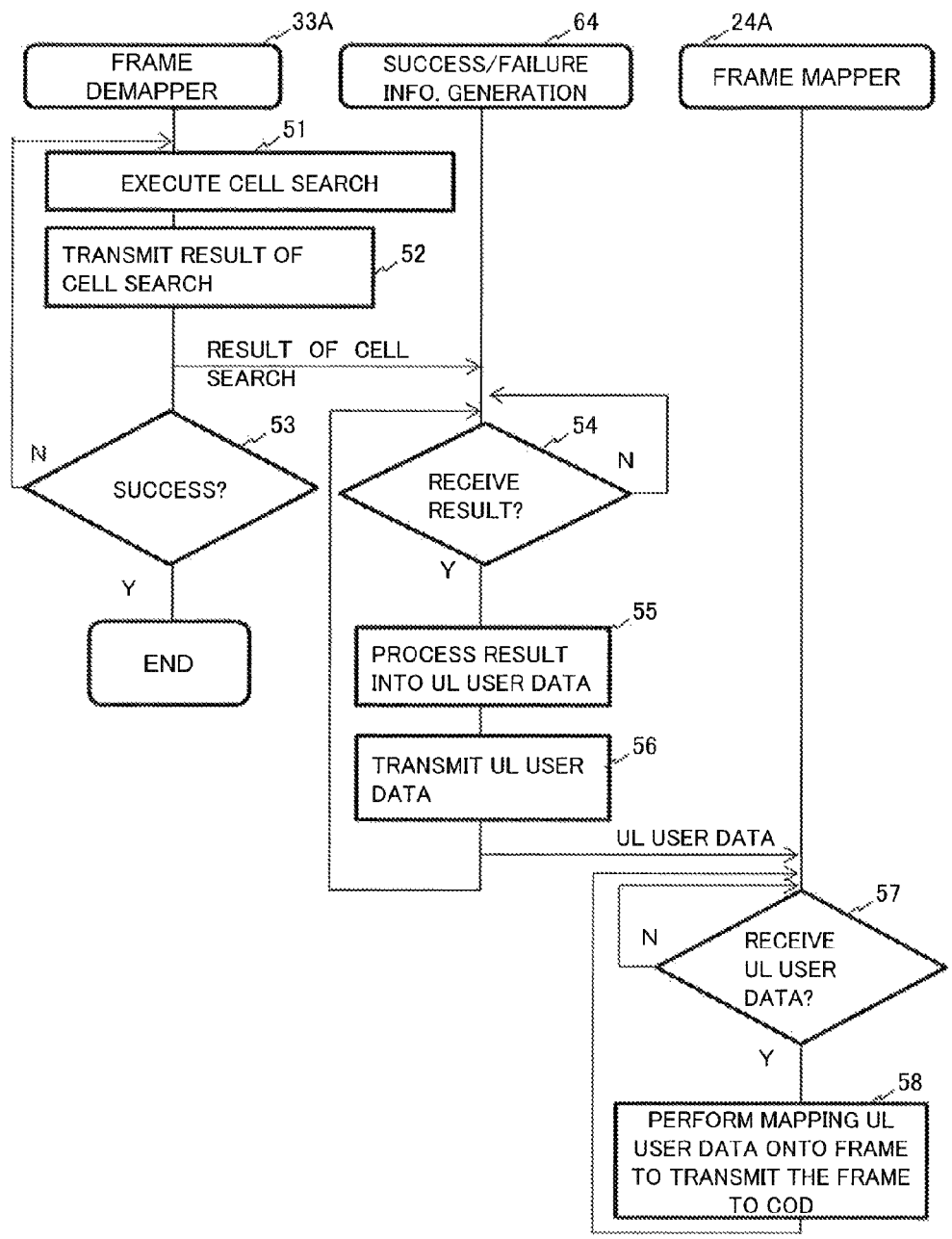
FIG. 19 is a flowchart illustrating processes in the terminal according to the second embodiment.

FIG. 19 is a flowchart illustrating processes in the terminal 13A according to the second embodiment. In FIG. 19, the frame demapper 33A performs the cell search (51), and transmits a result of the cell search to the success/failure information generation process 64 (52). Then, the frame demapper 33A finishes processing when the result of the cell search indicates the success (53, Yes). Whereas when the result of the cell search indicates the failure (53, No), the processing loops back to "51".

Upon being triggered by receiving the result of the cell search (54, Yes), the processor 43A executes the success/failure information generation process 64. To be specific, the processor 43A processes the result of the cell search (success or failure) into the uplink user data (55). Subsequently, the processor 43A transmits the uplink user data to the frame mapper 24. Thereafter, the processing loops back to "54".

The frame mapper 24 made to function by the DSP 41A, upon receiving the uplink user data containing the success/failure information (57, Yes), maps the uplink user data to the frame, and transmits the frame to the coder (COD) 25A (58). Thereafter, in the transmission system, the frame (see FIG. 17) containing the success/failure information finally becomes the radio signal directed to the macrocell base station 10A and is transmitted from the transmission antenna 28A.

Figure 20:
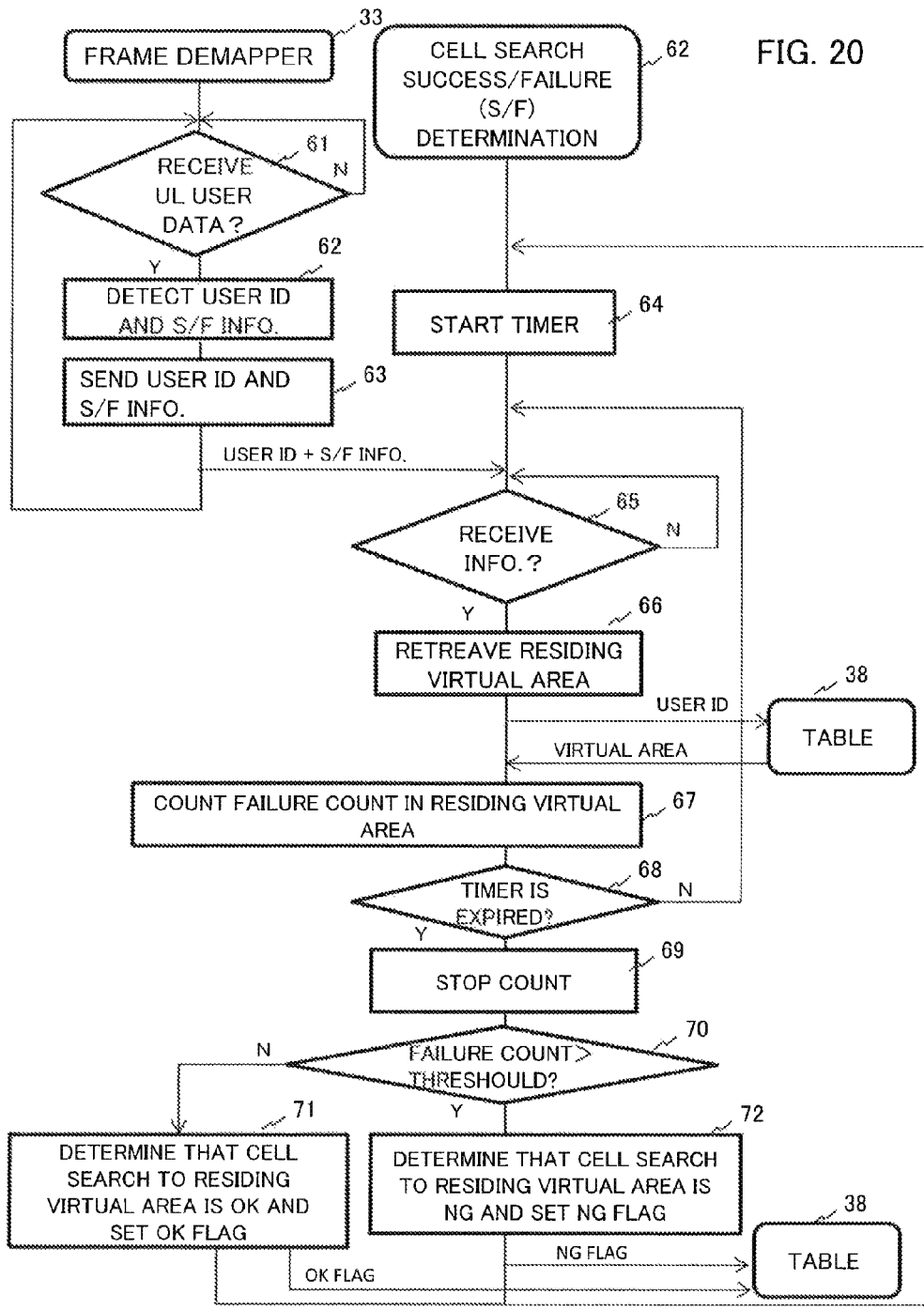
FIG. 20 is a flowchart illustrating processes about whether the cell search executed by the macrocell base station becomes successful.

FIG. 20 is a flowchart illustrating processes about whether the cell search is permitted or inhibited, the processes being executed by the macrocell base station 10A. in FIG. 20, the frame demapper 33, upon receiving the uplink user data (61), detects the user ID and the success/failure (S/F) information from the uplink user data (62), and transmits the user ID and the success/failure information to the cell search success/failure determination process (63). Thereafter, the processing loops back to "61".

The processor 43 operating as the cell search success/failure determination process 62, starts up a timer for measuring a predetermined period of time (64). The timer is set to start up at a fixed interval. The processor 43, upon receiving the user ID and the success/failure information from the frame demapper 33 during the measurement of the timer (65, Yes), checks whether or not the received user ID is identical with the user ID stored in the storage area 63. When the user IDs are identical with each other, the processor 43 searches for the residing virtual area of the terminal 13A having the user ID via the virtual area management process 35.

Specifically, the processor 43 hands over the user ID to the virtual area management process 35. Then, the processor 43 operating as the virtual area management process 35 reads the virtual area information associated with the user ID, i.e., the information of the virtual area in which the terminal 13A resides, from the residing virtual area table 38, and gives the virtual area information to the cell search success/failure determination process 62.

Thereupon, the processor 43 operating as the cell search success/failure determination process 62 determines whether the success/failure information indicates the failure or not, and, when indicating the failure, increments a value of the counter (unillustrated) by "1", the counter counting a number of failures in the residing virtual area.

Subsequently, the processor 43 determines whether the timer expires or not (68), and the processing loops back to "65" when the timer does not yet expire (68, No). Whereas when the timer expires (68, Yes), the counting of the number of failures is halted by stopping the counter (69).

Next, the processor 43 compares the counter value, i.e., the failure count within the predetermined period of time with a previously prepared threshold value, and thus determines whether the failure count exceeds the threshold value or not (70). Hereat, when the failure count is equal to or smaller than the threshold value (70, No), the processor 43 determines that the cell search throughout the residing virtual area is OK (i.e., the cell search is permitted), and sets an OK flag (71).

To be specific, the processor 43 requests the virtual area management process 35 to set the OK flag for the residing virtual area. The processor 43 operating as the virtual area management process 35 sets the OK flag for the residing virtual area in the residing virtual area table 38.

Whereas when the failure count exceeds the threshold value (70, Yes), the processor 43 determines that the cell search throughout the residing virtual area is NG (i.e., the cell search is inhibited), and sets a NG flag (72).

Specifically, the processor 43 requests the virtual area management process 35 to set the NG flag for the residing virtual area. The processor 43 operating as the virtual area management process 35 sets the NG flag for the residing virtual area in the residing virtual area table 38.

After the process "71" or "72", the processing loops back to "64", the timer is reset and starts measuring a new predetermined period of time. Note that a predetermined period of interval time may also be provided till the timer starts up next time.

As described above, the cell search success/failure determination process 62 counts the failure count of the cell search throughout the residing virtual area within the predetermined period measured by the timer by use of the success/failure information received from each terminal 13A (of which the user ID is stored in the storage area 63) residing in a certain virtual area. When the failure count exceeds the predetermined threshold value, the cell search throughout the residing virtual area is inhibited.

Figure 21:
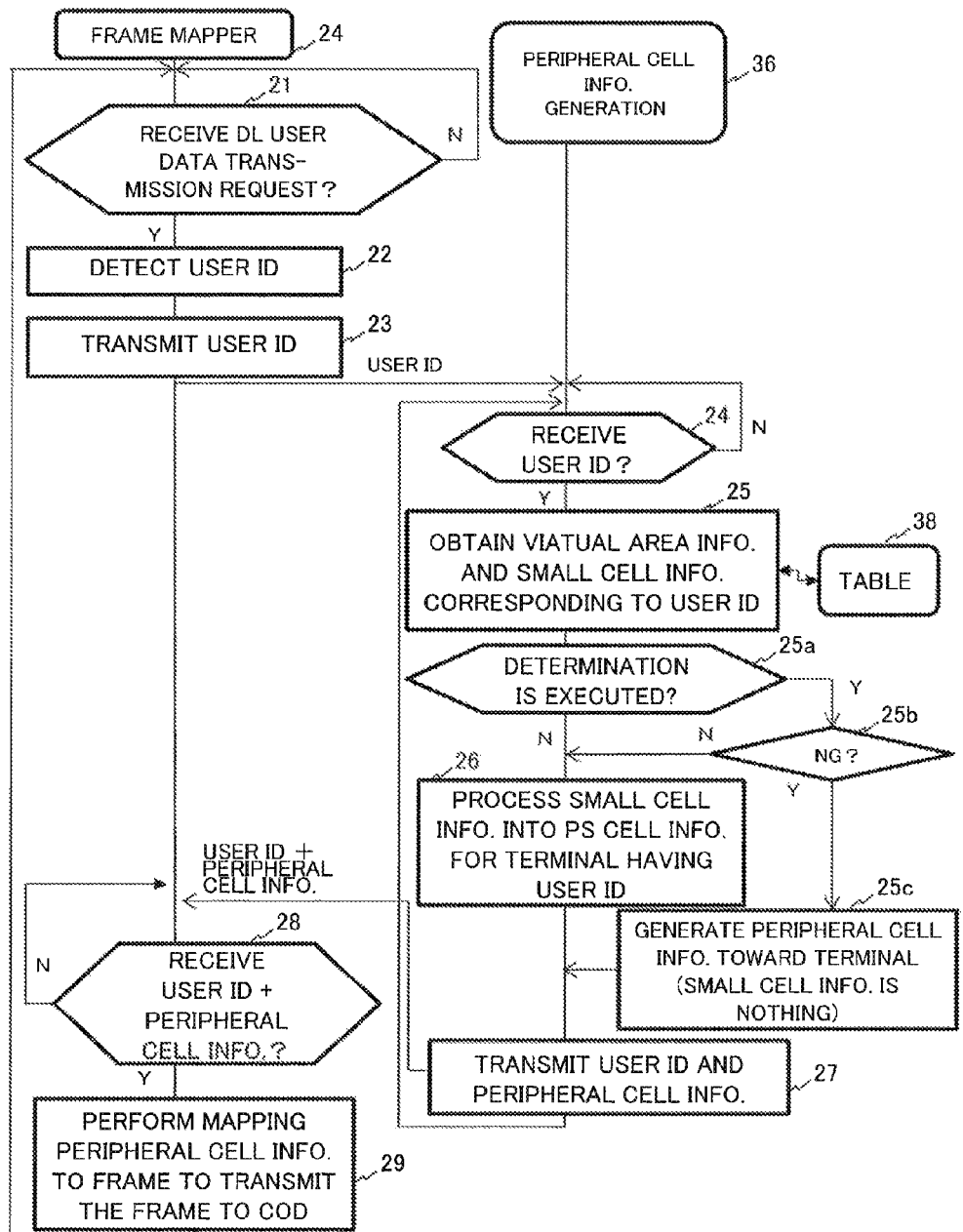
FIG. 21 is a flowchart illustrating a processing example related to a peripheral cell information generation process in the second embodiment.

FIG. 21 is a flowchart illustrating a processing example pertaining to the peripheral cell information generation process 36 in the second embodiment. Processes depicted in FIG. 21 are different from the processes (FIG. 12) in the first embodiment in terms of adding processes 25a, 25b and 25c.

The virtual area information and the small cell information associated with the user ID are acquired in the process "25" of FIG. 21. At this time, the OK flag or the NG flag registered by being associated with the virtual area information is also acquired in a process "71" or "72" in the second embodiment.

The processor 43 determines whether the cell search success/failure determination is made or not. Hereat, when the success/failure determination is not made (25a, No), the processing advances to "26", and the same process as in the first embodiment is executed.

Whereas when the success/failure determination is made (25a, Yes), the processing advances to "25b", and the processor 43 determines whether or not the NG flag is acquired in the process "25". Hereat, when the OK flag is acquired, the processing advances to a process "26", and the same process as in the first embodiment is carried out.

By contrast, when the NG flag is acquired, the processor 43 generates the peripheral cell information containing the small cell information purporting the non-existence of the small cell irrespective of whether the small cell actually exists in the residing virtual area (25c), and advances the processing to "27". Thereafter, the same processes as those in the first embodiment are executed.

In the process "25c", the peripheral cell information containing the small cell information indicating that any small cell does not exist in the residing virtual area, is transmitted to the terminal 13A. Then, the processes illustrated in FIG. 14 are executed. For instance, supposing that the terminal 13A is in a status of repeatedly retrying the cell search in a loop of the process "37" through the process "39", the terminal 13A receives the user data containing the peripheral cell information, and hence a "YES" determination is made in the process "39", thereby looping the processing back to "31". Thereafter, it is determined in the process "36" that the peripheral cell information indicates the non-existence of the small cell. As a result, the cell search stops being retried.

Each terminal 13A located in the virtual area with the NG flag being set is provided with the peripheral cell information indicating the non-existence of the small cell, thereby avoiding a futile cell search (with a low success rate) in the virtual area.

Note that the residing terminal is provided with the peripheral cell information indicating non-existence of the small cell in the virtual area with the NG flag being set, and therefore any success/failure information is not transmitted from each terminal residing in the area. As a consequence, the failure count of the cell search within the next predetermined period of time becomes equal to or smaller than the threshold value. In this case, the OK flag is set in the virtual area, and such a status therefore occurs that the success/failure determination is again made based on the success/failure information in the next predetermined period of time.

According to the second embodiment, the control about whether the terminal 13A is provided with the cell search information (cell search instruction) is conducted based on the result of the determination (the determination result about the cell search permission/inhibition) as to whether there is a high possibility of succeeding in the cell search by considering not only the condition of the geographical location of the terminal 13A but also the timewise varying wireless environment within the virtual area. This contrivance enables the cell search to be avoided in the virtual area under the temporarily deteriorated wireless environment, and also enables the reduction of the power consumption of the terminal 13A.

Third Embodiment

Next, a third embodiment will be described. The third embodiment has configurations being partly common to the first and second embodiments, and therefore the discussion will be focused on different points, while omitting the explanations of common points thereof.

In the second embodiment, the determination about the permission or the inhibition of the cell search throughout the virtual area is made based on the failure count of the cell search within the predetermined period of time. The third embodiment takes account of at least one of the time expended for the terminal to succeed in the cell search and a retry count till succeeding in the cell search in addition to the success/failure information to determine whether the cell search is permitted or inhibited.

Figure 22:
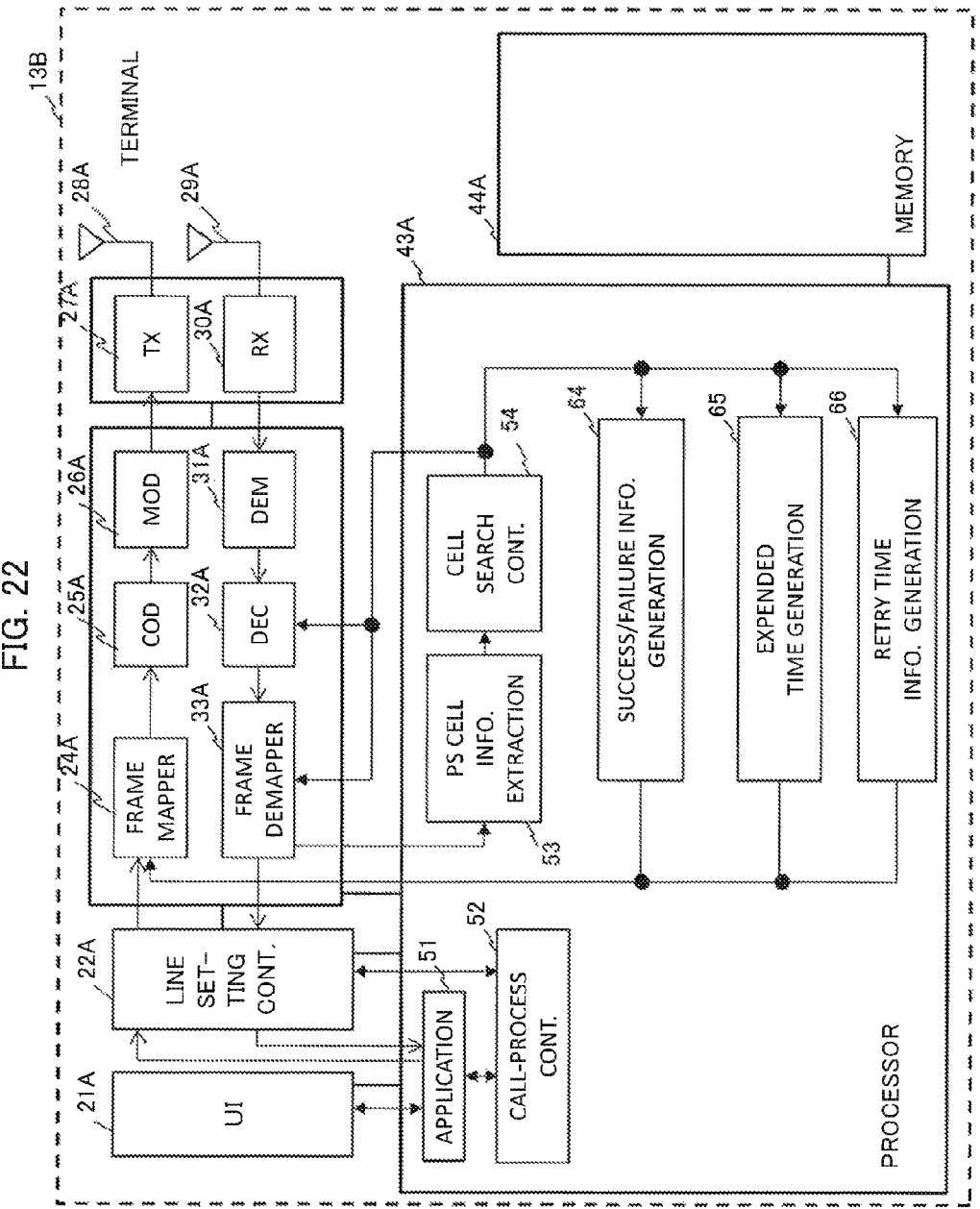
FIG. 22 illustrates an example of a configuration of the terminal according to a third embodiment.

FIG. 22 illustrates an example of a configuration of a terminal (terminal 13B) according to the third embodiment. The terminal 13B further includes a following configuration in addition to the configuration (FIG. 16) of the terminal 13A in the second embodiment.

To be specific, the processor 43A operating as the peripheral cell information extraction process 53 receives the peripheral cell information as the cell search instruction. The processor 43A operating as the cell search control 54 controls the decoder 32A and the frame demapper 33A for the cell search. These operations are the same as in the second embodiment. The processor 43A may receive the result (i.e., the success (OK) or the failure (NG) of the cell search) of the cell search executed by the decoder 32A and the frame demapper 33A.

In the third embodiment, the frame demapper 33A counts the retry count of the cell searches, and measures a period of time (the time expended for the cell search) expended till succeeding in the cell search. The frame demapper 33A outputs, in addition to the success/failure information, items of information of the expended time and the retry count when the success/failure information indicates the success in the cell search.

The processor 43A further executes an expended time information generation process 65 and a retry count information generation process 66 by running the program stored in the memory 44. The success/failure information output from the frame demapper 33A is supplied to the success/failure information generation process 64. The expended time is supplied to the expended time information generation process 65. The retry count is supplied to the retry count information generation process 66.

The success/failure information, the expended time and the retry count are supplied to and mapped to the frame by this frame mapper 24A, and are transmitted a macrocell base station (macrocell base station 10B) according to the third embodiment. The terminal 13B has the same configuration as the terminal 13A has, except the points described above, and hence the repetitive explanations are omitted.

FIG. 23 illustrates an example of a message transmitted from the terminal 13B. As depicted in FIG. 23, The success/failure information contains a cell ID of the small cell, a user ID (the identifying information (called also a terminal ID) of the terminal 13A) and cell search success/failure information, i.e., the information indicating a result (success or failure) of the cell search. As illustrated in FIG. 23, the message contains the cell ID defined as the small cell identifying information, the user ID (terminal ID) and the cell search success/failure information (indicating the success or the failure). The message further contains the expended time and the retry count when the success/failure information indicates the success.

Figure 24:
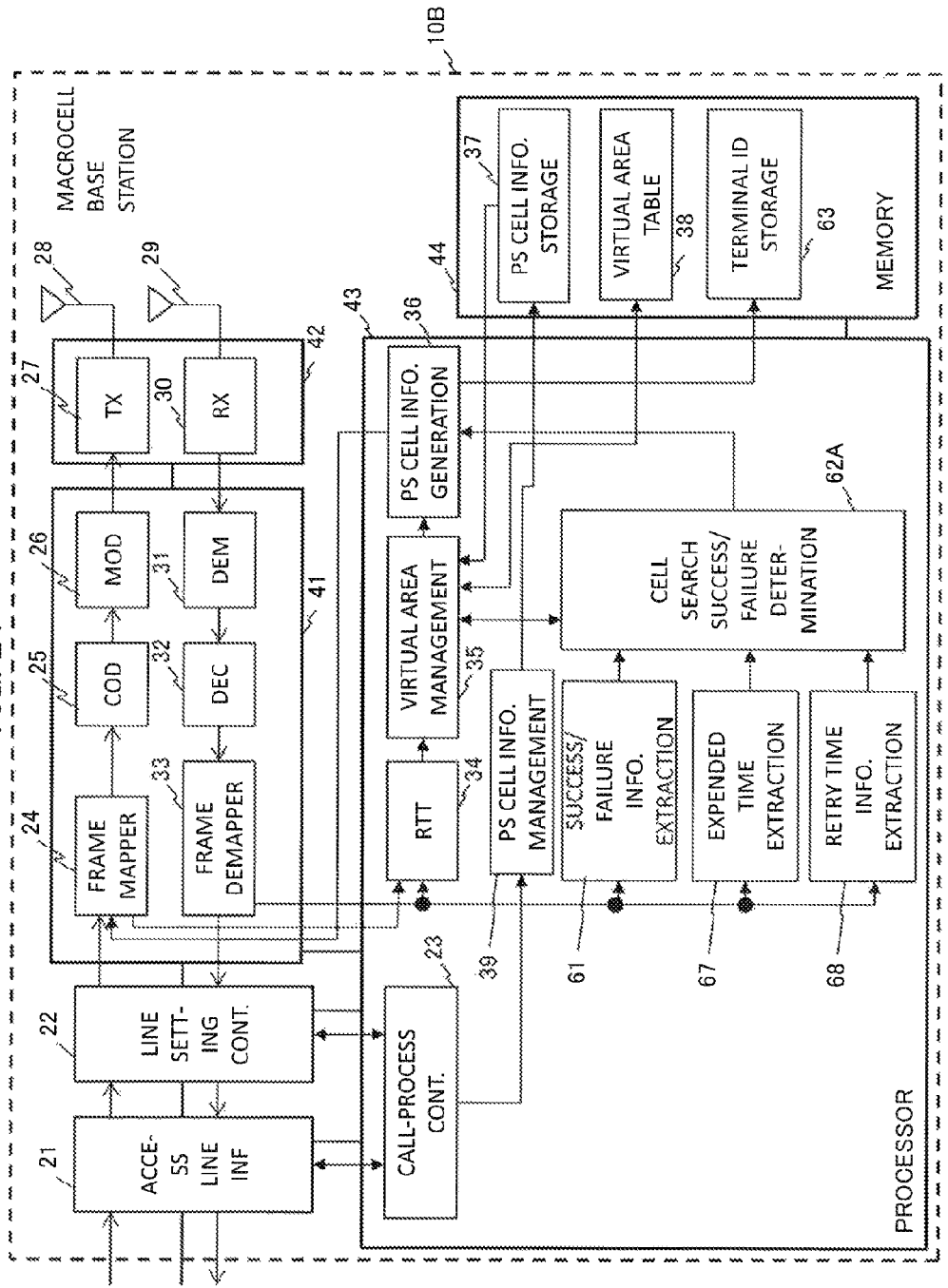
FIG. 24 illustrates an example of a configuration of the macrocell base station according to the third embodiment.

FIG. 24 depicts an example of a configuration of the macrocell base station 10B according to the third embodiment. The macrocell base station 10B further includes a following configuration in addition to the configuration (FIG. 18) of the macrocell base station 10A according to the second embodiment.

Specifically, the processor 43 further executes an expended time extraction process 67 and a retry count extraction process 68 by running the program. The memory 44 is further provided with a cell search instruction terminal ID storage area 63 (which will hereinafter be simply termed the "storage area 63").

The processor 43 operating as the expended time extraction process 67 extracts the expended time from the message (FIG. 23) obtained from the frame demapper 33, and supplies the expended time to a cell search success/failure determination process 62A. the processor 43 operating as the retry count extraction process 68 extracts the retry count contained in the message obtained from the frame demapper 33, and supplies the retry count to the cell search success/failure determination process 62A.

In the third embodiment, the processor 43 operating as the cell search success/failure determination process 62A determines whether the cell search for the small cell in the virtual area is permitted or inhibited by taking account of not only the success/failure information but also the expended time and the retry count.

Figure 25:
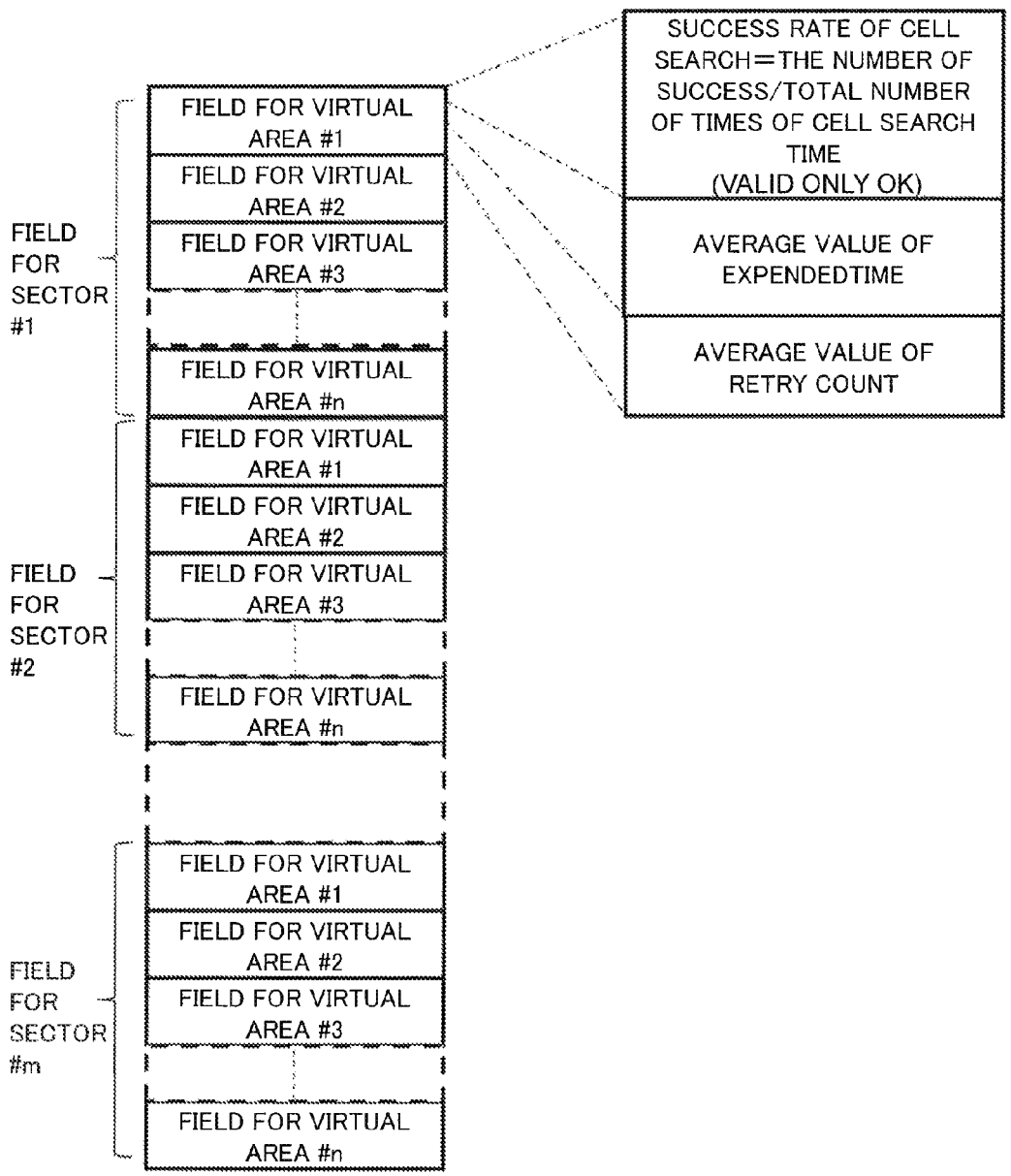
FIG. 25 illustrates an example of a table used in a cell search success/failure determination process according to the third embodiment.

FIG. 25 illustrates an example of a table used in the cell search success/failure determination process 62A. in FIG. 25, the table has a plurality of macrocell associated regions provided per macrocell (sector) configured by the macrocell base station 10B. Each sector area is formed with virtual area associated regions associated with the respective virtual areas obtained by dividing the macrocell.

A cell search success rate, an average value of the expended periods of time when succeeding in the cell searches, and an average value of the retry counts when succeeding in the cell searches are registered in each virtual area associated region. The cell search success rate is a value given by dividing the cell search success count by a total number of cell search trials. This table is stored in the memory 44. Similarly to the second embodiment, however, a count value of the failure count may also be stored in place of the success rate. A processing example, which will be explained below, describes an instance of storing the failure count.

Figure 26:
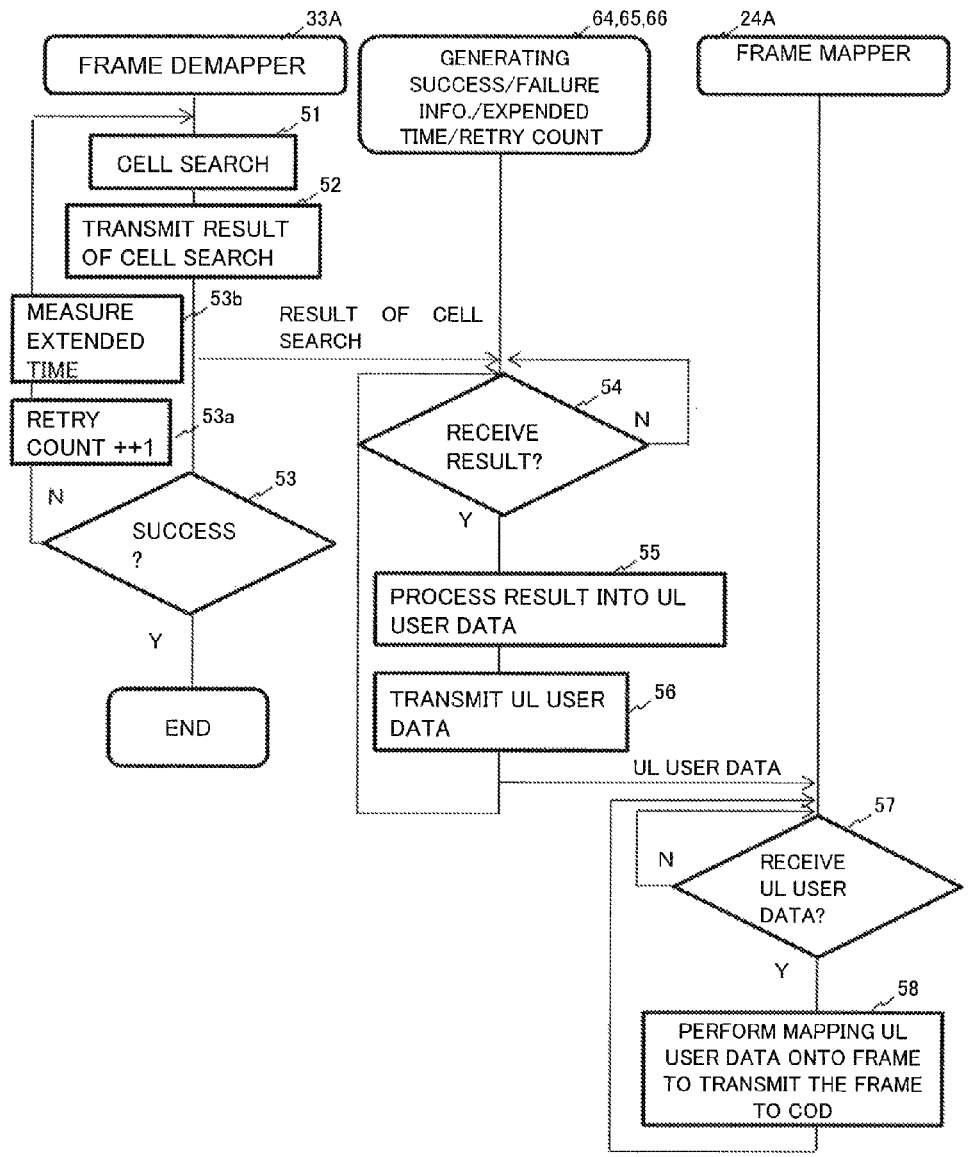
FIG. 26 is a flowchart illustrating processes in the terminal according to the third embodiment.

FIG. 26 is a flowchart illustrating processes in the terminal 13B according to the third embodiment. The following is a difference between the processes illustrated in FIG. 26 and the processes (FIG. 19) in the second embodiment. To be specific, in FIG. 26, the frame demapper 33A transmits the success/failure information (failure) in "52" when failing in the cell search as the result of the cell search.

Whereas when succeeding in the cell search, the frame demapper 33A transmits the cell search result containing the success/failure information (success), the expended time till reaching the success and the retry count till reaching the success in "52". The frame demapper 33A increments the retry count by "1" (53*a*) when failing in the cell search (53, Yes), then measures the expended time (53*b*), and loops back the processing to "51".

Thus, the frame demapper 33A according to the third embodiment measures the expended time till reaching the success, counts the retry count till reaching the success, and gets these items of data contained in the cell search result when succeeding in the cell search.

In the process "54", the success/failure information generation process 64 receives the success/failure information; the expended time information generation process 65 receives the expended time; and the retry count information generation process 66 receives the retry count.

In the process "55", the success/failure information generation process 64 processes the success/failure information into the uplink user data; the expended time information generation process 65 processes the expended time into the uplink user data; and the retry count information generation process 66 processes the retry count into the uplink user data. These items of uplink user data are transmitted to the frame mapper 24A (56). The processes given thereafter are the same as those in the second embodiment. Consequently, the cell search result having the contents depicted in FIG. 23 is sent to the macrocell base station 10B.

Figure 27:
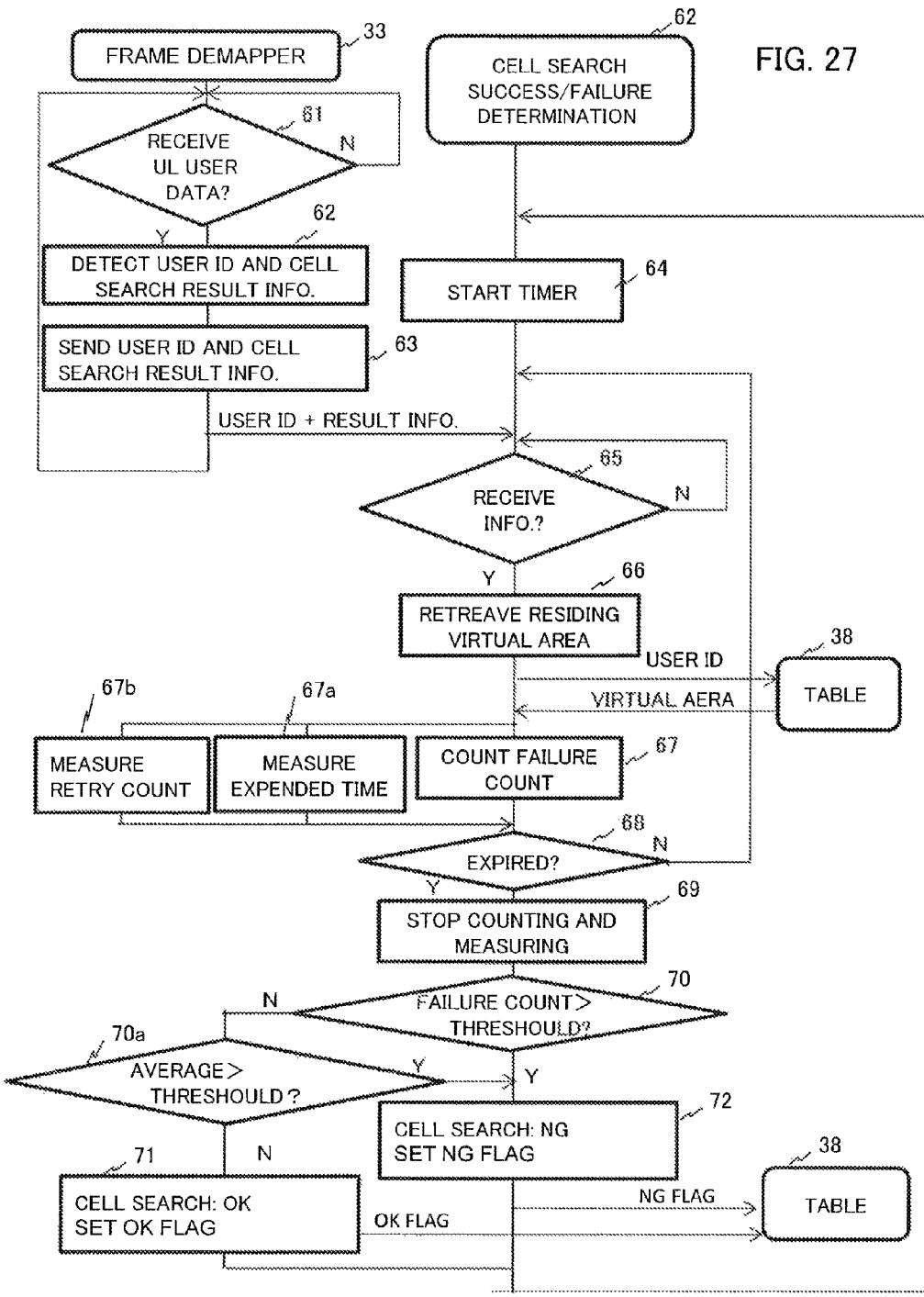
FIG. 27 is a flowchart illustrating processes about the cell search success/failure determination, the processes being executed by the macrocell base station according to the third embodiment.

FIG. 27 is a flowchart illustrating processes related to the cell search permission/inhibition determination made by the macrocell base station 10B. The following is a difference between the processes (FIG. 20) in the second embodiment and the processes illustrated in FIG. 27.

The frame demapper 33, upon receiving the uplink user data (61), detects the user ID, the cell search result information (the success/failure information, the expended time (when succeeding) and the retry count (when succeeding)) from the uplink user data (62), and transmits the detected data to a user ID/cell search result information cell search permission/inhibition determination process 62A (63). Thereafter, the processing loops back to "61".

Processes "64"-"67" of the cell search permission/inhibition determination process 62A are the same as those in the second embodiment. However, the processor 43 further executes measuring an average value of the expended periods of time (67*a*) and measuring an average value of the retry counts (67*b*). The table illustrated in FIG. 25 is used for the processes "67", "67*a*" and "67*b*".

The processor 43, upon being triggered by the expiration of the timer (68), stops counting the failure count and measuring the average values of the expended periods of time and the retry counts (69). Subsequently, the processor 43, similarly to the second embodiment, determines whether or not the failure count within the predetermined period of time exceeds the threshold value (70). When the failure count exceeds the threshold value (70, Yes), the processing is the same as in the second embodiment.

Whereas when the failure count is equal to or smaller than the threshold value (70, No), the processor 43 determines whether the cell search is permitted or inhibited, by using the average values of the retry counts and of the expended periods of time. The average values of the retry counts and of the expended periods of time are one example of an index value. For example, when at least one of the average value of the retry counts and the average value of the expended periods of time exceeds the threshold value, the processing advances to "72" to set the NG flag. By contrast, when both of these two average values are equal to or smaller than the threshold value, the processing advances to "71" to set the OK flag. The processes "71" and "72" themselves are the same as those in the second embodiment.

As described above, even when the failure count of the cell search is equal to or smaller than the threshold value and when the average value of the retry counts in the predetermined period of time or the average value of the expended periods of time exceeds the threshold value, the wireless environment in the residing virtual area is determined to be temporarily deteriorated, thereby setting the NG flag.

According to the third embodiment, the determination of whether the cell search is permitted or inhibited is made based on a much stricter determination criterion than determining based on the success/failure information whether the cell search is permitted or inhibited. This contrivance enables the reduction of the possibility that the terminal 13B performs the cell search at the low success rate, and may contribute to the reduction of the power consumption.

Note that the determination in "70*a*" may be made to set the NG flag when both of the average values of the retry counts and the expended periods of time exceed the threshold value. The determination process in "70" and the determination process in "70*a*" may also be reversed in sequence. The cell search success rate described above may be calculate in place of counting the failure count in the process "67", and it may also be determined in the process "70" whether the cell search success rate in the predetermined period of time is equal to or larger than the threshold value. In this case, the OK flag is set when the success rate is equal to or larger than the threshold value, while the NG flag is set when the success rate is smaller than the threshold value.

Note that the number of the virtual areas into which the macrocell is divided and the number of small cells disposed in the macrocell, which have been described in the first through third embodiments, are exemplifications, and the number of the virtual areas may be properly set corresponding to the locations of the small cells. The plurality of small cells may be located in one virtual area. In this case, the determination about the permission and inhibition of the cell search executed in the second and third embodiments may be made per small cell within the virtual area.

The determination about the permission and inhibition of the cell search executed in the second and third embodiments is made on the virtual area basis. As a substitute for this, the determination about the permission and inhibition of the cell search may be made on a user ID (terminal) basis of the terminal residing in the virtual area. In this instance, the failure count, the retry count and the expended time are counted and measured per user ID. With this contrivance, the cell search for the small cell is controlled per terminal.

Fourth Embodiment

Next, a fourth embodiment will be described. The fourth embodiment has a configuration being partly common to the second or third embodiment, and therefore the discussion will be focused on different points, while omitting the explanations of common points thereof.

Figure 28:
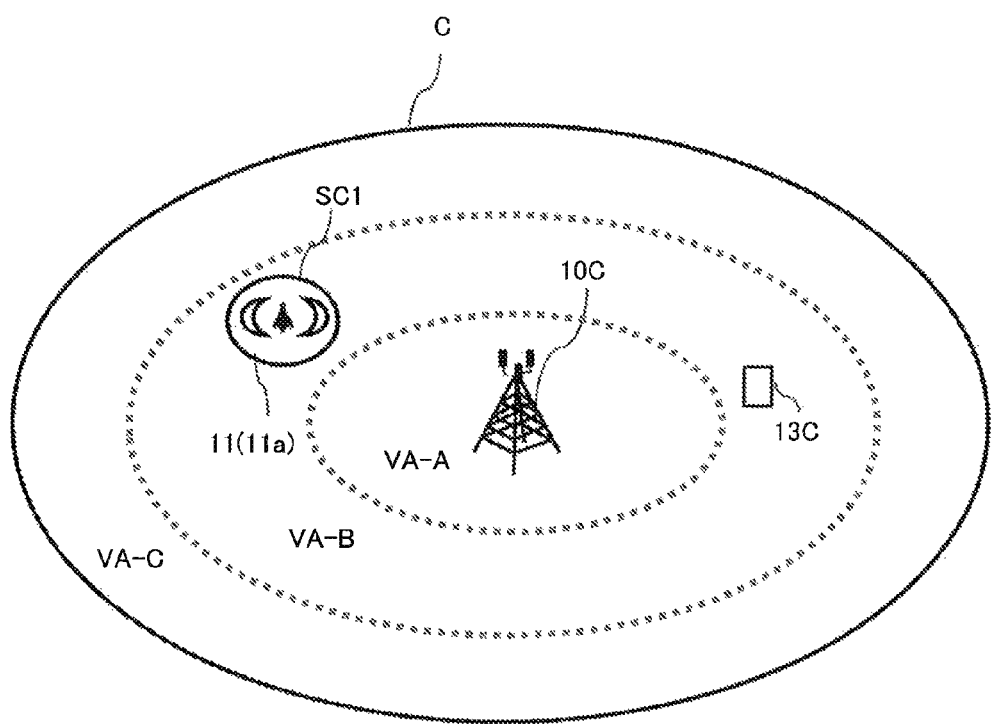
FIG. 28 is an explanatory view of a fourth embodiment.

The fourth embodiment will describe a mode in which the macrocell base station configures the omni cell. FIG. 28 is an explanatory view of the fourth embodiment. In FIG. 28, a macrocell base station 10C according to the fourth embodiment configures a cell C classified as the omni cell. The cell C is a circular area centered at a location of the macrocell base station 10C, and functions as one macrocell.

The small cell SC1 is located within the cell C. the macrocell base station 10C divides, based on information (a central position and a cell radius) of the small cell SC1 that this obtained from, e.g., a host apparatus, the cell C into a plurality of virtual areas. A method of generating the virtual areas may involve applying the method described in the first embodiment.

FIG. 28 depicts a state in which the cell C is divided based on the small cell SC1 into a circular virtual area VA-A, an annular virtual area VA-B circumscribing the virtual area VA-A, and an annular virtual area VA-C circumscribing the virtual area VA-B.

The macrocell base station 10C may execute the processes illustrated in FIGS. 20 and 21 by applying the configuration (FIG. 18) of the macrocell base station 10A according to the second embodiment. In this case, the terminal 13C may execute the processes illustrated in FIG. 19 by applying the configuration (FIG. 16) of the terminal 13A.

Alternatively, the macrocell base station 10C may execute the processes illustrated in FIG. 27 by applying the configuration (FIG. 24) of the macrocell base station 10B according to the third embodiment. In this instance, the terminal 13C may execute the processes illustrated in FIG. 26 by applying the configuration (FIG. 22) of the terminal 13B.

The macrocell base station 10C may execute determining whether the cell search is permitted or inhibited per virtual area as described the second or third embodiment. Hence, e.g., when the terminal 13C is distanced from the small cell in the residing virtual area to such a degree as not to reach the success in the cell search, the terminal 13C is not provided with the cell search instruction (the small cell information of the small cell SC1) by setting the NG flag.

For example, as depicted in FIG. 28, the terminal 13C and the small cell SC1 are located in the same virtual area VA-B. However, the terminal 13C is located on an opposite side with the macrocell base station 10C being interposed therebetween. In this case, the terminal 13C cannot detect the small cell SC1 even by performing the cell search for the small cell SC1. Accordingly, as a result of repeating the cell search, the failure count of the cell search in the predetermined period of time exceeds the threshold value.

The terminal 13C is thereby enabled to receive the peripheral cell information indicating non-existence of the small cell from the macrocell base station 10C and to stop the cell search. Note that the determination of the permission or the inhibition of the cell search is made per user ID (terminal 13C).

According to the embodiments, the efficient cell search for the small cells may be carried out. The configurations according to the first through fourth embodiments discussed above may be properly combined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A macrocell base station to form a macrocell, the macrocell base station comprising:
   a storage configured to store information of a plurality of virtual areas obtained by dividing the macrocell and information of small cells associated with the plurality of virtual areas; and
   a controller configured to:
   using a distance between the macrocell base station and a terminal residing in the macrocell, specify a virtual area where the terminal is located from among the plurality of virtual areas;
   generate cell search information for a small cell located in the specified virtual area using the information of the plurality of virtual areas and the information of small cells, wherein the cell search information is transmitted to the terminal;
   receive success/failure information indicating a success or a failure in a cell search for the small cell located in the specified virtual area from at least one terminal located in the specified virtual area; and
   based on the received success/failure information, transmit an instruction for avoiding the cell search for the small cell to a terminal located in the specified virtual area.

2. The macrocell base station according to claim 1, wherein the controller is configured to transmit the instruction when a failure count of the cell search within a predetermined period of time obtained using the success/failure information exceeds a threshold value.

3. The macrocell base station according to claim 1, wherein the controller is configured to:
   receive the success/failure information and at least one of an expended period of time till succeeding in the cell search and a retry count till succeeding in the cell search; and
   transmit the instruction when avoidance of the cell search is indicated by at least one of a failure count of the cell search within a predetermined period of time obtained using the success/failure information, and an index value obtained from at least one of the expended period of time and the retry count that are received within the predetermined period of time.

4. A terminal residing in a macrocell formed by a macrocell base station, comprising:
   a controller configured to:
   receive from the macrocell base station, cell search information of a small cell located in a virtual area included in a plurality of virtual areas obtained by dividing the macrocell, wherein the terminal is in the virtual area where is specified based on a distance between the macrocell base station and the terminal;

control the cell search for the small cell based on the cell search information;

transmit to the macrocell base station, success/failure information indicating a success or a failure in a cell search executed based on the cell search information; and avoid the cell search for the small cell based on an instruction received from the macrocell base station receiving the success/failure information.

5. The terminal according to claim 4, wherein the controller is configured to avoid the cell search for the small cell based on the instruction received from the macrocell base station when a failure count of the cell search within a predetermined period of time exceeds a threshold value.

6. The terminal according to claim 4, wherein the controller is configured to:

transmit to the macrocell base station, the success/failure information, and at least one of an expended period of time till succeeding in the cell search and a retry count till succeeding in the cell search; and avoid the cell search for the small cell based on the instruction received from the macrocell base station when avoidance of the cell search is indicated by at least one of the failure count of the cell search within a predetermined period of time obtained using the success/failure information, and an index value obtained from at least one of the expended period of time and the retry count that are received within the predetermined period of time.

7. A small cell search control method of a macrocell base station to form a macrocell, the method comprising:

storing information of a plurality of virtual areas obtained by dividing the macrocell and information of small cells associated with the plurality of virtual areas;

using a distance between the macrocell base station and a terminal residing in the macrocell, specifying, by a processor, the virtual area where the terminal is located from among the plurality of virtual areas;

generating, by the processor, cell search information for a small cell located in the specified virtual area using the information of the plurality of virtual areas and the information of small cells, wherein the cell search information is transmitted to the terminal;

receiving, by the processor, success/failure information indicating a success or a failure in a cell search for the small cell executed based on the cell search information from at least one terminal located in the specified virtual area; and based on the success/failure information, transmitting, by the processor, an instruction for avoiding the cell search for the small cell to a terminal located in the specified virtual area.

8. A small cell search control method of a terminal residing in a macrocell formed by a macrocell base station, the method comprising:

receiving from the macrocell base station, cell search information of a small cell located in a virtual area included in a plurality of virtual areas obtained by dividing the macrocell, wherein the terminal is in the virtual area where is specified based on a distance between the macrocell base station and the terminal;

controlling, by a processor, the cell search for the small cell based on the cell search information;

transmitting, by the processor, success/failure information indicating a success or a failure in a cell search executed based on the cell search information to the macrocell base station; and avoiding, by the processor, the cell search for the small cell based on an instruction received from the macrocell base station receiving the success/failure information.

* * * * *